US012616224B2

(12) United States Patent
Reed et al.

(10) Patent No.: US 12,616,224 B2
(45) Date of Patent: May 5, 2026

(54) STRUCTURED HIGH-PROTEIN MEAT ANALOGUE COMPOSITIONS

(71) Applicant: Air Protein, Inc., Pleasanton, CA (US)

(72) Inventors: John Reed, Pleasanton, CA (US); Dan Robertson, Pleasanton, CA (US); Kripa Rao, Pleasanton, CA (US)

(73) Assignee: Air Protein, Inc., San Leandro, CA (US)

( * ) Notice: Subject to any disclaimer, the term of this patent is extended or adjusted under 35 U.S.C. 154(b) by 23 days.

(21) Appl. No.: 17/362,990

(22) Filed: Jun. 30, 2021

(65) Prior Publication Data

US 2021/0392908 A1     Dec. 23, 2021

Related U.S. Application Data

(63) Continuation-in-part of application No. PCT/US2021/020147, filed on Feb. 28, 2021.

(60) Provisional application No. 62/984,253, filed on Mar. 2, 2020.

(51) Int. Cl.

| | |
|---|---|
| *A23J 3/34* | (2006.01) |
| *A23J 1/00* | (2006.01) |
| *A23J 3/14* | (2006.01) |
| *A23J 3/20* | (2006.01) |
| *A23J 3/22* | (2006.01) |
| *A23J 3/30* | (2006.01) |
| *A23L 33/195* | (2016.01) |
| *A21D 2/26* | (2006.01) |

(52) U.S. Cl.
CPC ............... *A23J 3/347* (2013.01); *A23J 1/008* (2013.01); *A23J 3/14* (2013.01); *A23J 3/20* (2013.01); *A23J 3/227* (2013.01); *A23J 3/30* (2013.01); *A23L 33/195* (2016.08); *A21D 2/267* (2013.01)

(58) Field of Classification Search
CPC ......... A21D 2/268; A21D 2/267; A23J 1/008; A23J 3/227; A23J 3/347; A23J 3/20; A23J 3/22; A23L 33/195
See application file for complete search history.

(56) References Cited

U.S. PATENT DOCUMENTS

| | | | |
|---|---|---|---|
| 3,420,739 | A | 1/1969 | Bongers et al. |
| 3,442,620 | A | 5/1969 | Huebler et al. |
| 3,852,492 | A | 12/1974 | Brown, Jr. et al. |
| 3,887,431 | A | 6/1975 | Robbins et al. |
| 3,888,740 | A | 6/1975 | Ishizaki et al. |
| 3,891,774 | A | 6/1975 | Baker et al. |
| 3,925,562 | A | 12/1975 | Tannenbaum |
| 3,939,284 | A | 2/1976 | Akin et al. |
| 4,191,782 | A | 3/1980 | Vedamuthu |
| 4,367,146 | A | 1/1983 | Pollock et al. |
| 4,426,450 | A | 1/1984 | Donofrio |
| 4,607,011 | A | 8/1986 | Kaplan et al. |
| 4,806,479 | A | 2/1989 | Kegel et al. |
| 4,849,230 | A | 7/1989 | Varvello |
| 4,859,588 | A | 8/1989 | Sublette |
| 5,034,232 | A | 7/1991 | Sugitani et al. |
| 5,173,429 | A | 12/1992 | Gaddy et al. |
| 5,186,731 | A | 2/1993 | Parker |
| 5,250,427 | A | 10/1993 | Weaver et al. |
| 5,342,702 | A | 8/1994 | MacGregor |
| 5,593,886 | A | 1/1997 | Gaddy |
| 5,807,722 | A | 9/1998 | Gaddy |
| 5,821,111 | A | 10/1998 | Grady et al. |
| 6,187,565 | B1 | 2/2001 | Weaver |
| 6,340,581 | B1 | 1/2002 | Gaddy |
| 6,506,389 | B2 | 1/2003 | Leer et al. |
| 7,285,402 | B2 | 10/2007 | Gaddy et al. |
| 7,687,091 | B2 | 3/2010 | Moen et al. |
| 7,776,124 | B2 | 8/2010 | Binder et al. |
| 7,955,833 | B2 | 6/2011 | Reiter et al. |
| 8,093,045 | B2 | 1/2012 | Pla et al. |
| 8,236,522 | B2 | 8/2012 | Bauer et al. |
| 8,440,408 | B2 | 5/2013 | Grillberger et al. |
| 8,672,245 | B2 | 3/2014 | Finnigan et al. |
| 9,011,949 | B2 | 4/2015 | Brown et al. |
| 9,085,785 | B2 | 7/2015 | Reed et al. |
| 9,157,058 | B2 | 10/2015 | Dalla-Betta et al. |
| 9,506,086 | B2 | 11/2016 | Jannson et al. |
| 9,526,267 | B2 | 12/2016 | Anderson et al. |
| 9,556,462 | B2 | 1/2017 | Reed et al. |
| 9,700,067 | B2 | 7/2017 | Fraser et al. |
| 9,737,875 | B2 | 8/2017 | Brown et al. |

(Continued)

FOREIGN PATENT DOCUMENTS

| | | |
|---|---|---|
| CA | 2255212 A1 | 6/1999 |
| CL | 2018002647 A1 | 4/2019 |

(Continued)

OTHER PUBLICATIONS

Decicco, B.T., Removal of Eutrophic Nutrients from Wastewater and their Bioconversion to Bacterial Single Cell Protein for Animal Feed Supplements Phase III, Water Resources Research Center, Apr. 1980.

Farrell, A., et al., Ethanol Can Contribute to Energy and Environmental Goals, Science 311:506-508, Jan. 27, 2006.

Feisthauer, S., et al., Differences of heterotrophic 13CO2 assimilation by Pseudomonas knackmussii strain B13 and Rhodococcus opacus 1CP and potential impact on biomarker stable isotope probing, Environmental Microbiology 10(6):1641-1651, 2008.

(Continued)

*Primary Examiner* — Nikki H. Dees
*Assistant Examiner* — Andrew E Merriam
(74) *Attorney, Agent, or Firm* — Wilson Sonsini Goodrich & Rosati

(57) ABSTRACT

Structured food compositions, such as meat analogue compositions, which include protein products from microorganisms, such as microorganism-derived protein hydrolysates, are described. Methods of making such products are also described.

15 Claims, 3 Drawing Sheets

(56) References Cited

U.S. PATENT DOCUMENTS

| | | | |
|---|---|---|---|
| 9,808,029 | B2 | 11/2017 | Fraser et al. |
| 9,826,772 | B2 | 11/2017 | Fraser et al. |
| 9,833,768 | B2 | 12/2017 | Brown et al. |
| 9,879,290 | B2 | 1/2018 | Kurek et al. |
| 9,938,327 | B2 | 4/2018 | Shankar et al. |
| 9,943,096 | B2 | 4/2018 | Fraser et al. |
| 9,957,534 | B2 | 5/2018 | Kurek et al. |
| 10,039,306 | B2 | 8/2018 | Vrljic et al. |
| 10,087,434 | B2 | 10/2018 | Kale et al. |
| 10,093,913 | B2 | 10/2018 | Kale et al. |
| 10,172,380 | B2 | 1/2019 | Varadan et al. |
| 10,172,381 | B2 | 1/2019 | Vrljic et al. |
| 10,273,492 | B2 | 4/2019 | Shankar et al. |
| 10,287,568 | B2 | 5/2019 | Kale et al. |
| 10,314,325 | B2 | 6/2019 | Fraser et al. |
| 10,327,464 | B2 | 6/2019 | Fraser et al. |
| 10,696,941 | B2 | 6/2020 | Dalla-Betta et al. |
| 10,863,761 | B2 | 12/2020 | Brown et al. |
| 11,013,250 | B2 | 5/2021 | Vrljic et al. |
| 11,219,232 | B2 | 1/2022 | Fraser et al. |
| 11,224,241 | B2 | 1/2022 | Fraser et al. |
| 11,466,246 | B2 | 10/2022 | Dyson et al. |
| 12,059,006 | B2 | 8/2024 | Brooks et al. |
| 12,408,684 | B2 | 9/2025 | Dyson et al. |
| 2001/0018048 | A1 | 8/2001 | Leer et al. |
| 2002/0040871 | A1 | 4/2002 | Garcia et al. |
| 2003/0003528 | A1 | 1/2003 | Brzostowicz et al. |
| 2003/0022364 | A1 | 1/2003 | Parent et al. |
| 2003/0087234 | A1 | 5/2003 | Heumann |
| 2003/0134822 | A1 | 7/2003 | Maekawa et al. |
| 2004/0078846 | A1 | 4/2004 | Desouza et al. |
| 2004/0203134 | A1 | 10/2004 | Pyntikov et al. |
| 2006/0286205 | A1 | 12/2006 | Fichtali et al. |
| 2007/0065540 | A1 | 3/2007 | Jones et al. |
| 2008/0022593 | A1 | 1/2008 | Gur et al. |
| 2008/0107793 | A1 | 5/2008 | Tanaka et al. |
| 2008/0160044 | A1 | 7/2008 | Marshall |
| 2008/0193987 | A1 | 8/2008 | Mantelatto et al. |
| 2009/0117194 | A1 | 5/2009 | Burja et al. |
| 2009/0130706 | A1 | 5/2009 | Berzin et al. |
| 2009/0142322 | A1 | 6/2009 | Ye |
| 2009/0191593 | A1 | 7/2009 | Burk et al. |
| 2009/0291188 | A1 | 11/2009 | Milne et al. |
| 2010/0093860 | A1 | 4/2010 | Boon et al. |
| 2010/0189864 | A1 | 7/2010 | Marsland |
| 2010/0235934 | A1 | 9/2010 | Friedman et al. |
| 2011/0020884 | A1 | 1/2011 | Latouf et al. |
| 2011/0027181 | A1 | 2/2011 | Amodei et al. |
| 2011/0034218 | A1 | 2/2011 | Sung et al. |
| 2012/0015413 | A1 | 1/2012 | Sichwart et al. |
| 2012/0084886 | A1 | 4/2012 | Lopez-Cervantes et al. |
| 2012/0128851 | A1 | 5/2012 | Brooks et al. |
| 2013/0032362 | A1 | 2/2013 | Rylander |
| 2013/0078690 | A1 | 3/2013 | Reed |
| 2013/0089899 | A1 | 4/2013 | Kurek et al. |
| 2013/0149755 | A1 | 6/2013 | Reed et al. |
| 2014/0029916 | A1 | 1/2014 | Dhawan et al. |
| 2014/0271994 | A1 | 9/2014 | Smittle et al. |
| 2014/0329309 | A1 | 11/2014 | Bongiorni et al. |
| 2015/0037853 | A1 | 2/2015 | Fischer et al. |
| 2015/0044327 | A1 | 2/2015 | Feinberg et al. |
| 2015/0284744 | A1 | 10/2015 | Jannson et al. |
| 2015/0296834 | A1 | 10/2015 | Geistlinger |
| 2016/0073671 | A1 | 3/2016 | Geistlinger et al. |
| 2016/0137969 | A1 | 5/2016 | Haas |
| 2016/0297458 | A1 | 10/2016 | Chuchvara et al. |
| 2016/0340411 | A1 | 11/2016 | Fraser et al. |
| 2017/0016330 | A1 | 1/2017 | Yaakoby |
| 2017/0023110 | A1 | 1/2017 | Oledzki et al. |
| 2017/0035076 | A1 | 2/2017 | Geistlinger et al. |
| 2017/0106330 | A1 | 4/2017 | Gebald et al. |
| 2017/0112175 | A1 | 4/2017 | Fraser et al. |
| 2017/0130211 | A1 | 5/2017 | Bradshaw et al. |
| 2017/0137969 | A1 | 5/2017 | Cory et al. |
| 2017/0188612 | A1 | 7/2017 | Varadan et al. |
| 2017/0295833 | A1 | 10/2017 | Fraser et al. |
| 2017/0342132 | A1 | 11/2017 | Fraser et al. |
| 2017/0369922 | A1 | 12/2017 | Olsson et al. |
| 2018/0016779 | A1 | 1/2018 | Courson |
| 2018/0169153 | A1 | 6/2018 | Berry et al. |
| 2019/0000124 | A1 | 1/2019 | Sefton et al. |
| 2019/0133162 | A1 | 5/2019 | Varadan et al. |
| 2019/0133163 | A1 | 5/2019 | Varadan et al. |
| 2019/0382808 | A1 | 12/2019 | Reed |
| 2019/0390158 | A1 | 12/2019 | Dyson et al. |
| 2020/0060308 | A1 | 2/2020 | Manchuliantsau et al. |
| 2020/0060309 | A1 | 2/2020 | Odontella |
| 2020/0165733 | A1 | 5/2020 | Reed et al. |
| 2020/0216797 | A1 | 7/2020 | Dyson et al. |
| 2020/0236973 | A1 | 7/2020 | Bigeard et al. |
| 2021/0070842 | A1 | 3/2021 | Fraser et al. |
| 2021/0084940 | A1 | 3/2021 | Schlebusch |
| 2021/0289824 | A1 | 9/2021 | Brown et al. |
| 2021/0392920 | A1 | 12/2021 | Dyson et al. |
| 2021/0395677 | A1 | 12/2021 | Reed et al. |
| 2023/0101863 | A1 | 3/2023 | Robertson et al. |

FOREIGN PATENT DOCUMENTS

| | | |
|---|---|---|
| CL | 2019002160 A1 | 5/2020 |
| CL | 2022000064 A1 | 10/2022 |
| CL | 2022001785 A1 | 3/2023 |
| CL | 2022001994 A1 | 4/2023 |
| CL | 2022002382 A1 | 4/2023 |
| CL | 2022002385 A1 | 4/2023 |
| CN | 101808534 A | 8/2010 |
| CN | 104955945 A | 9/2015 |
| CN | 105050414 A | 11/2015 |
| CN | 105745332 A | 7/2016 |
| CN | 106455626 A | 2/2017 |
| CN | 106686987 A | 5/2017 |
| CN | 109154006 A | 1/2019 |
| CN | 110241054 A | 9/2019 |
| CN | 110331106 A | 10/2019 |
| CN | 110678539 A | 1/2020 |
| CO | 2022009812 A2 | 8/2022 |
| CO | 2022011967 A2 | 8/2022 |
| CO | 2022013873 A2 | 10/2022 |
| CO | 2022015198 A2 | 10/2022 |
| DE | 2160478 A1 | 6/1972 |
| EP | 131220 A2 | 1/1985 |
| EP | 0212292 A1 | 3/1987 |
| EP | 1264895 A1 | 12/2002 |
| EP | 2135939 A1 | 12/2009 |
| EP | 2264142 A2 | 12/2010 |
| EP | 3628173 A1 | 4/2020 |
| EP | 3816293 A1 | 5/2021 |
| FI | 129711 B | 7/2022 |
| FI | 129784 B | 8/2022 |
| GB | 1059861 A | 2/1967 |
| JP | S5486695 A | 7/1979 |
| JP | 54119091 A | 9/1979 |
| JP | S5645200 A | 4/1981 |
| JP | H02171196 A | 7/1990 |
| JP | H06501934 A | 3/1994 |
| JP | 06169783 A | 6/1994 |
| JP | 7163363 A | 6/1995 |
| JP | 2516154 B2 | 7/1996 |
| JP | 2912684 B2 | 6/1999 |
| JP | 2002338443 A | 11/2002 |
| JP | 2007049989 A | 3/2007 |
| JP | 2010273683 A | 12/2010 |
| JP | 2013542710 A | 11/2013 |
| JP | 2016502867 A | 2/2016 |
| JP | 2017509349 A | 4/2017 |
| JP | 2019517775 A | 6/2019 |
| JP | 2019165737 A | 10/2019 |
| KR | 2003020766 A | 3/2003 |
| KR | 2004051920 A | 2/2004 |
| KR | 20180134906 A | 12/2018 |
| WO | 98/00558 A1 | 1/1998 |
| WO | WO-9957246 A1 | 11/1999 |
| WO | WO-0003000 A2 | 1/2000 |
| WO | 02/08438 A2 | 1/2002 |

(56) References Cited

FOREIGN PATENT DOCUMENTS

| WO | WO-2004005493 A1 | 1/2004 | | |
| WO | WO-2004078955 A1 | 9/2004 | | |
| WO | 2005/001981 A2 | 1/2005 | | |
| WO | WO-2007139321 A1 | 12/2007 | | |
| WO | 2009/009388 A2 | 1/2009 | | |
| WO | 2009/058028 A1 | 5/2009 | | |
| WO | 2009/113853 A2 | 9/2009 | | |
| WO | 2011/014953 A1 | 2/2011 | | |
| WO | 2011/056183 A1 | 5/2011 | | |
| WO | 2011/112695 A1 | 9/2011 | | |
| WO | 2011/139804 A2 | 11/2011 | | |
| WO | WO-2012030217 A2 | 3/2012 | | |
| WO | WO-2012148769 A1 | 11/2012 | | |
| WO | 2013/090769 A2 | 6/2013 | | |
| WO | 2013/148348 A1 | 10/2013 | | |
| WO | WO-2013186348 A1 | 12/2013 | | |
| WO | 2014/145194 A2 | 9/2014 | | |
| WO | 2015/027209 A2 | 2/2015 | | |
| WO | WO-2015038796 A2 | 3/2015 | | |
| WO | 2015/177800 A2 | 11/2015 | | |
| WO | 2016/044423 A1 | 3/2016 | | |
| WO | 2017/015321 A1 | 1/2017 | | |
| WO | WO-2017019125 A1 | 2/2017 | | |
| WO | 2017/165244 A1 | 9/2017 | | |
| WO | 2018/144965 A1 | 8/2018 | | |
| WO | WO-2018162346 A1 | 9/2018 | | |
| WO | WO-2019070602 A1 | 4/2019 | | |
| WO | WO-2019246066 A1 | 12/2019 | | |
| WO | WO-2020097363 A2 | 5/2020 | | |
| WO | 2020/232347 A1 | 11/2020 | | |
| WO | WO-2020222239 A1 | 11/2020 | | |
| WO | 2020/240095 A1 | 12/2020 | | |
| WO | 2021/055366 A1 | 3/2021 | | |
| WO | WO-2021084159 A1 | 5/2021 | | |
| WO | 2021/138482 A1 | 7/2021 | | |
| WO | 2021/151025 A1 | 7/2021 | | |
| WO | 2021/178254 A1 | 9/2021 | | |
| WO | 2021/195259 A1 | 9/2021 | | |
| WO | WO-2021174226 A1 * | 9/2021 | ............ | A23C 11/10 |
| WO | 2021/240315 A1 | 12/2021 | | |
| WO | WO-2022229500 A1 | 11/2022 | | |
| WO | WO-2022229503 A1 | 11/2022 | | |
| WO | 2023/278301 A1 | 1/2023 | | |
| WO | WO-2023278306 A1 | 1/2023 | | |
| WO | WO-2023278317 A1 | 1/2023 | | |
| WO | WO-2023278557 A1 | 1/2023 | | |
| WO | WO-2024118522 A1 | 6/2024 | | |

OTHER PUBLICATIONS

Ghose, T.K., et al., Advances in Biochemical Engineering, Chapter 6, Novel Energy and Carbon Sources, Springer-Verlag Berlin-Heidelberg, 1971.

Greife, et al., Nitrogen Metabolism in Broiler Chickens Consuming the Bacterial Strain Alcaligenes eutrophus, Animal Feed Science and Technology 5:241-253, 1980.

Henstra, A.M., et al., Microbiology of synthesis gas fermentation for biofuel production, Current Opinions in Biotechnology 18:200-206, 2007.

Hugler, M., et al., Evidence for Autotrophic CO2 Fixation via the Reductive Tricarboxylic Acid Cycle by Members of the epsilon Subdivision of Proteobacteria, Journal of Bacteriology 187(9):3020-3027, 2005.

Huijgen, W., et al., Carbon dioxide sequestration by mineral carbonation, Preprints of Papers: American Chemical Society, Division Fuel Chemistry, 41:1403-1406, 1996.

Ishizaki, A., et al., Batch culture of Alcaligenes eutrophus ATCC 176971 using recycled gas closed circuit culture system, Journal of Fermentation and Bioengineering 69(3):170-174, 1990.

Jannasch, H.W., et al., Geomicrobiology of Deep-Sea Hydrothermal Vents, Science 229:717-725, Aug. 23, 1985.

Jones, J., The Cativa Process for the Manufacture of Acetic Acid, Platinum Metals Rev 44(3):94-105, 2000.

Kasparkova, K., et al., Characterization of Low-Molecular Weight Collagen Hydrolysates Prepared by Combination of Enzymatic and Acid Hydrolysis, Journal of American Leather Chemists Association 104(2):46-51, 2009.

King, G., Molecular and Culture-Based Analyses of Aerobic Carbon Monoxide Oxidizer Diversity, Applied and Environmental Microbiology 69(12):7257-7265, 2003.

Klatte, S., et al., Rhodococcus opacus sp. novl., An Unusual Nutritionally Versatile Rhodococcus-species, System Appl Microbiol 17:355-360, 1994.

Kunasundari, B., et al., Revisiting the Single Cell Protein Application of Cupriavidus necator H16 and Recovering Bioplastic Granules Simultaneously, PLOS ONE 8(10:e78528, Oct. 2013.

Lehmicke, L., et al., Organiztion of Genes Necessary fro Growth of the Hydrogen-Methanol Autotroph Xanthobacter sp. Strai H4-14 on Hydrogen and Carbon Dioxide, J Bacteriol 162(3):1244-1249, 1985.

Macler, B.A., et al., Hydrogen Formation in Nearly Stoichiometric Amounts from Glucose by a Rhodopseudomonas sphaeroides Mutant, Bacteriology 138(2):446-452, 1979.

Madigan, M., et al., Growth of the Photosynthetic Bacterium Rhodopsuedomonas capsulata Chemoautotrophically in Darkness with H2 as the Energy Source, Journal of Bacteriology 137(1):524-530, Jan. 1979.

Madigan, M., et al., Physiology of Dark Fermentative Growth of Rhodopseudomonas capsulata, Journal of Bacteriology 142(3):908-915, Jun. 1980.

Manninen, A.H., Protein Hydrolysates in Sports and Exercise: A Brief Review, Journal of Sports Science and Medicine, 3:60-63, 2004.

Matassa, S., et al., Resource recovery from used water: The manufacturing abilities of hydrogen-oxidizing bacteria, Water Research 68:467-478, 2015.

Miltner, A., et al., Non-phototrophic CO2 fixation by soil microorganisms, Plant and Soil 269:193-203, 2005.

Miura, A., et al., A Soluble NADH-Dependent Fumarate Reductase in the Reductive Tricarboxylic Acid Cycle of Hydrogenobacter thermophilus TK-6, Journal of Bacteriology 190(21)7170-7177, 2008.

Munoz, et al., Algal-bacterial processes for the treatment of hazardous contaminants: a review, Water Research 40 (15):2799-1815, 2006.

Murugan, P., et al., A new biological recovery approach for PHA using mealwork, Tenebrio molitor, Journal of Biotechnology 239:98-105, 2016.

Ong, S. Y., et al., An integrative study on biologically recovered polyhydroxyalkanaoates (PHAs) and simultaneous assessment of gut microbiome in yellow mealworm, Journal of Biotechnology 265:31-39, 2018.

Oren, A., Chemolithotrophy, Encylopedia of Life Sciences, John Wiley & Sons, Ltd., 2009.

Paoli, G.C., et al., Aerobic chemolithoautotrophic growth and RubisCO function in Rhodobacater capsulatus and a spontaneous gain of function mutant of Rhodobacter sphaeroides, Arch Microbiol 170:8-17, 1998.

Rapp, P., et al., Formation, Isolation and Characterization of Trehalose Dimycolates from Rhodococcus erythropilis Grown in n-Alkanes, Journal of General Microbiology 115:491-503, 1979.

Repaske, R., et al., Dense Autotrphic Culutures of Alcaligenes eutrophus, Applied and Environmental Microbiology 32(4):592-597, 1976.

Roth, M.S., The engine of the reef: photobiology of coral-algal synbiosis, Frontiers in Microbiology 5: Article 422, Aug. 22, 2014.

Schlegel, H.G., et al., The Production of Biomass from Hydrogen and Carbon Dioxide, Advances in Biochemical Engineering, 1:143-168, 1971.

Searchinger, T., et al., The great balancing act, World Resources Institute Working Paper, Washington, DC, 2013.

International Search Report in corresponding International Patent Application No. PCT/US2021/020147, dated Jun. 29, 2021, 4 pages.

(56) References Cited

OTHER PUBLICATIONS

L. Bongers (1970) "Energy generation and utilization in hydrogen bacteria" Journal of bacteriology 104(1):145-151 (http://jb.asm.org/content/104/1/145.abstract).

Shively, J., et al., Something from Almost Nothing: Carbon Dioxide Fixation in Chemoautotrophs, Annu. Rev. Microbiol. 52:19-230, 1998.

Storebakken, et al., Bacterial protein grown on natural gas in diets for Atlantic salmon, *Salmo salar,* in freshwater, Aquaculture 241(1-4):413-425, 2004.

Takeshita, T., et al., Studies on Dissolved Hydrogen Behavior in Autotrophic Culture of Alcaligenes eutrophus ATCC 17697, J. Fac. Kyushu Univ. 38(1-2):55-64, 1993.

Tanaka, K., et al., Production of Poly(D-3-Hydroxybutyrate) from CO2 H2, and 02 by High Cell Denisty Autotrophic Cultivation of Alcaligenes eutrophus, Biotechnology and Bioengineering 45:268-275, 1995.

Taub, F.B., Closed Ecological Systems, Annu. Rev. Ecol. Syst. 5:139-160, 1974.

NASA Ames Research Center, The Closed Life-Support System, Apr. 14-15, 1966, 229 pages.

Tokuda, H., et al., Effects of electrical pre-treatment on the hydrolysis of agricultural wastes, J. Brew. Soc . . . Japan 101(10):769-775, 2006.

Toyoda, K., et al., The role of two CbbRs in the transcriptional regulation of three ribulose-1,5-biphosphate carboxylase/oxygenase genes in Hydrogenovibrio marinus strain MH-110, Microbiology 151:3615-3625, 2005.

Turner, J., et al., Renewable hydrogen production, Int J Energy Res DOI:10.1002/er.1372, 2007.

Volova, T.G., et al., Autotrophic synthesis of polyhydroxyalkanoates by the bacteria Ralstonia eutropha in the presence of carbon monoxide, Appl Microbiol Biotechnol 58:675-678, 2002.

Voss, I., et al., High cell density cultivation of Rhodococcus opacus for lipid production at a pilot-plant scale, Appl Microbiol Biotechnol 55:547-555, 2001.

Wahlund, T.M., et al., Bioconversion of CO2 to Ethanol and Other Compounds, Preprints of Papers—American Chemical Society Division Fuel Chemistry 41:1408-1406, 1996.

Walterman, M., et al., Rhodococcus opacus strain PD630 as a new source of high-value single-cell oil? Isolation and characterization of triacylglycerols and other storage lipids, Microbiology 146:1143-1149, 2000.

Watanabe, Y., et al., Microbial CO2 Fixation, Journal of the Agricultural Chemical Society of Japan, 61 (10):1322-1325, 1987.

Yamamoto, M., et al., Role of two 2-oxoglutarate:ferredoxin oxidoreuctases in Hydrogenobacter thermophilus under aerobic and anaerobic conditions, FEMS Microbiol Lett 263:189-193, 2006.

Alvarez, H., et al., Formation of intracytoplasmic inclusions by Rhodococcus opacus strain PD630, Arch Microbiol 165:377-386, 1996.

Anderson, A.J., et al., Occurrence, Metabolism, Metabolic Role, and Industrial Uses of Bacterial Polyhydroxyalkanoates, Microbiological Reviews 54(4):450-472, 1990.

Barbir, F., PEM electrolysis for production of hydrogen from renewable energy sources, Solar Energy 78:661-669, 2005.

Barton, L.L., The Cell Wall Matrix, Structural and Functional Relationships in Prokaryotes, pp. 136-189, Springer, 2005.

Bligh, E.G., et al., A Rapid Method of Total Lipid Extraction and Purification, Canadian Journal of Biochemistry and Physiology 37(8):911-917, 1959.

Bogdahn, I., Agriculture-independent, sustainable, fail-safe and efficient food production by autotrophic single-cell protein, PeerJ PrePrints, https://dx.doi.org/10/7287/peerj.preprints.1279v3, Sep. 17, 2015.

Bongers, L., Energy Generation and Utilization in Hydrogen Bacteria, Journal of Bacteriology 104(1):145-151, 1979.

Calloway, D.H., et al., Protein Quality of the Bacterium *Hydrogenomonas eutropha,* Applied Microbiology 17 (1):176-178, 1969.

Calloway, D.H., et al., Investagation of the Nutritional Properties of Hydrogenomonas eutropha, Final Report to the National Aeronautics and Space Administration NGR 05-003-089, 1968.

Campbell, B.J., et al., Hydrogen isotopic fractionation in lipid biosynthesis by H2-consuming Desulfobacterium autotrophicum, Geochiica et Cosmochimica Acta 73:2744-2757, 2009.

Chang, C.C., et al., Hydrogenotrophic denitrification with immobilized Alcaligenes eutrophus for drinking water treatment, Bioresource Technology 69:53-58, 1999.

Chee, J.Y., et al., The Potential Applicataion of Cupriavidus necator as Polyhydroxy-alkanoates Producer and Single Cell Protein: A Review on Scientific, Cultural and Religious Perspectives, Applied Food Biotechnology 6(1):19-34, 2019.

Chung, S.Y., et al., Purification of form L2 RubisCO from a marine obligately autotrophic hydrogen-oxidizing bacterium, *Hydrogenovibrio marinus* strain MH-110, FEMS Microbiology Letters 109, 49-54, 1993.

Decicco, B.T., Removal of Eutrophic Nutrients from Wastewater and their Bioconversion to Bacterial Single Cell Protein for Animal Feed Supplements Phase I, Water Resources Research Center, Nov. 1977.

Decicco, B.T., Removal of Eutrophic Nutrients from Wastewater and their Bioconversion to Bacterial Single Cell Protein for Animal Feed Supplements Phase I, Water Resources Research Center, Apr. 1979.

International Search Report in corresponding International Application No. PCT/US22/35092, dated Nov. 30, 2022, 3 pages.

Akdogan. High moisture food extrusion. International Journal of Food Science and Technology 1999, 34, 195-207.

Bohrer. An investigation of the formulation and nutritional composition of modern meat analogue products. Food Science and Human Wellness 8 (2019) 320-329. Available online Nov. 22, 2019.

Bringel et al. Extent of Genetic Lesions of the Arginine and Pyrimidine Biosynthetic Pathways in Lactobacillus plantarum, L. paraplantarum, L. pentosus, and L. casei: Prevalence of CO2-Dependent Auxotrophs and Characterization of Deficient arg Genes in L. plantarum. Appl Environ Microbiol. May 2003; 69(5): 2674-2683.

Cheftel et al. New protein texturization processes by extrusion cooking at high moisture levels. Food Reviews International, 8:2, pp. 235-275 (1992).

Chen et al. System parameters and product properties response of soybean protein extruded at wide moisture range. Journal of Food Engineering 96 (2010) 208-213. Available online Jul. 25, 2009.

Ciani, et al. Microbes: Food for the Future. Foods. vol. No. 10, Issue No. 5 (2021): 13 Pages.

Co-pending U.S. Appl. No. 18/520,471, inventors Bachman; Louisa Cook et al., filed Nov. 27, 2023.

Database GNPD [Online] MINTEL; Nov. 6, 2019 (Nov. 6, 2019), anonymous: "Vegan Breaded Fillets", XP093098385, Database accession No. 7008709. 4 pages.

Database GNPD [Online] MINTEL; Oct. 9, 2019 (Oct. 9, 2019), anonymous: "Vegetarian Ham Slices", XP093098387, Database accession No. 6937941. 2 pages.

Diels et al. High-Pressure Homogenization as a Non-Thermal Technique for the Inactivation of Microorganisms. Critical Reviews in Microbiology, 32:201-216, 2006.

El Abbadi ,S H, et al., "Engineering the Dark Food Chain," Environmental Science & Technology, vol. 53, No. 5, (Mar. 5, 2019), pp. 2273-2287.

EP20910909.9 Extended European Search Report dated Nov. 27, 2023.

Fei et al. Effective recovery of poly-β-hydroxybutyrate (PHB) biopolymer from Cupriavidus necator using a novel and environmentally friendly solvent system. Biotechnol Prog. May 2016;32(3):678-85. Epub Mar. 2, 2016.

Foster, et al. A Continuous Culture Apparatus for the Microbial Utilization of Hydrogen Produced by Electrolysis of Water in Closed-Cycle Space System. Biotechnology and Bioengineering, vol. 6 (1964): 16 Pages.

(56)　　　　　References Cited

OTHER PUBLICATIONS

Franek. Oligopeptides as External Molecular Signals Affecting Growth and Death in Animal Cell Cultures. In Protein Hydrolysates in Biotechnology, Pasupuleti and Demain, Eds., 2010, Springer, pp. 79-88.

Hanko, et al. Biosensor-informed Engineering of Cupriavidus Necator H16 for Autotrophic D-Mannitol Production. Metabolic Engineering. vol. No. 72 (2022): 11 Pages.

International Search Report and Written Opinion in corresponding International Application No. PCT/US2021/23949, mailed Aug. 26, 2021.

International Search Report for PCT/US2020/67555 mailed Apr. 6, 2021.

International Search Report for PCT/US2022/35086 mailed Sep. 23, 2022.

Kenny et al. Growth phase and growth medium effects on the peptidase activities of Lactobacillus helveticus. International Dairy Journal 13 (2003) 509-516.

Kunji et al. The proteolytic systems of lactic acid bacteria. Antonie Van Leeuwenhoek. 1996;70:187-221.

Lobo-Alfonso et al. Benefits and Limitations of Protein Hydrolysates as Components of Serum-Free Media for Animal Cell Culture Applications. In Protein Hydrolysates in Biotechnology, Pasupuleti and Demain, Eds., 2010, Springer, pp. 55-78.

Mersmann, A., et al., Packungskolonnen. Chem.-Ing.-Tech. 58(1):19-31 (1986). With English machine translation.

Mierau et al. Casein and Peptide Degradation in Lactic Acid Bacteria. Biotechnol Genet Eng Rev. 1997;14:279-301.

Misono et al. Purification, Crystallization and Properties of NADP+-Specific Glutamate Dehydrogenase from Lactobacillus fermentum. Agric Biol Chem 49(1):117-123 (1985).

Molskness et al. β-D-Phosphogalactoside Galactohydrolase of Lactic Streptococci. Applied Microbiology, vol. 25, No. 3, pp. 373-380 (Mar. 1973).

Morel et al. The prolyl aminopeptidase from *Lactobacillus delbrueckii* subsp. *bulgaricus* belongs to the alpha/beta hydrolase fold family. Biochimica et Biophysica Acta 1429 (1999) 501-505.

Moscicki ed. Extrusion-Cooking Techniques: Applications, Theory and Sustainability. Chapters 1-3, pp. 1-63. 2011. Wiley-VCH Verlag GmbH & KGaA.

Nasseri et al. Single Cell Protein: Production and Process. American Journal of Food Technology (13 pgs.) (2011).

Nippon Nogeikagaku Kaishi [Igarashi, Y.], Physiological properties of hydrogen oxidizing bacteria and their application. 61(10):1322-1325 (1987). With English machine translation.

Osen et al. High-Moisture Extrusion: Meat Analogues. Reference Module in Food Sciences (2016). 7 pages. http://dx.doi.org/10.1016/B978-0-08-100596-5.03099-7.

PCT/US2021/014795 International Search Report and Written Opinion dated Jun. 3, 2021.

PCT/US2022/035110 International Search Report and Written Opinion dated Sep. 14, 2022.

Plattner. Extrusion Techniques for Meat Analogues. Cereal Foods World, vol. 65, No. 4 (Jul.-Aug. 2020). 8 pages.

Poolman et al. Casein—breakdown by Lactococcus lactis. In: Faruk Bozoğlu, T., Ray, B. (eds) Lactic Acid Bacteria. NATO ASI Series, vol. 98 (1996). Springer, Berlin, Heidelberg. 24 pages.

Poolman et al. Relation of growth of *Streptococcus lactis* and *Streptococcus cremoris* to amino acid transport. J Bacteriol. Feb. 1988; 170(2): 700-707.

Salmiati et al. Recovery of Polyhydroxyalkanoates (PHAs) from Mixed Microbial Cultures by Simple Digestion and Saponification. Malaysia: University Teknology, Institute of Environmental and Water Resource Management, pp. 8-15 (2009). Retrieved at URL: https://www.researchgate.net/profile/Gustaf-Olsson/publication/237489392_Recovery_of_Polyhydroxyalkanoates_PHAs_from_Mixed_Microbial_Cultures_by_Simple_Digestion_and_Saponification/links/0046352b7ecfc5f4ce000000/Recovery-of-Polyhydroxyalkanoates-PHAs-from-Mixed-Microbial-Cultures-by-Simple-Digestion-and-Saponification.pdf.

Spearman et al. The bioactivity and fractionation of peptide hydrolysates in cultures of CHO cells. Biotechnol Prog. May-Jun. 2014;30(3):584-93. Epub May 28, 2014.

Sung et al. Yeast hydrolysate as a low-cost additive to serum-free medium for the production of human thrombopoietin in suspension cultures of Chinese hamster ovary cells. Appl Microbiol Biotechnol . Feb. 2004;63(5):527-36. Epub Jul. 11, 2003.

U.S. Appl. No. 16/716,398 Office Action dated Jan. 29, 2021.

U.S. Appl. No. 16/716,398 Office Action dated Oct. 14, 2020.

Vachon et al. Inactivation of Foodborne Pathogens in Milk Using Dynamic High Pressure. Journal of Food Protection, vol. 65, No. 2, pp. 345-352 (2002).

Van De Velde et al. Destruction of microorganisms and toxins by extrusion-cooking. In Thermal Processing and Quality of Foods (Zeuthen et al, eds.), Elsevier Applied Science Publisher, London (1984): pp. 155-161.

Viniegra-Gonzalez et al. Lactic acid production by pure and mixed bacterial cultures. In: Wise DL (ed) Bioconversion Systems, CRC Press, Boca Raton, Florida, pp. 17-39 (1984).

Wahlund, T.M., et al., Bioconversion of CO2 to ethanol and other compounds. Preprints of Papers—American Chemical Society Division Fuel Chemistry 41:1403-1406 (1996).

Waslien, et al. Human Intolerance to Bacteria as Food. Nature. vol. No. 221, Issue No. 5175 (1969): 2 Pages.

Written Opinion for PCT/US2020/67555 mailed Apr. 6, 2021.

Written Opinion for PCT/US2021/020147 dated Jun. 29, 2021.

Written Opinion for PCT/US2022/035092 dated Nov. 30, 2022.

Written Opinion for PCT/US2022/35086 mailed Sep. 23, 2022.

Brigham, Christopher, et al. Manipulation of Ralstonia Eutropha Carbon Storage Pathways to Produce Useful Bio-based Products. Sub-cellular Biochemistry. vol. 64 (2012): pp. 343-366.

Coelho, Catarina, et al. The Crystal Structure of Cupriavidus Necator Nitrate Reductase in Oxidized and Partially Reduced States. J Mol Biol (2011) 408, 932-948.

EP21763853.5 Extended European Search Report dated Feb. 12, 2024.

Jian, Hui. Do you dare to eat artificial meat? Understand the things about artificial meat in one article, Website: Zhihu, Website: https://zhuanlan.zhihu.com/p/78598503?utm_id=0, (2019): 8 Pages. With machine translation.

PCT/US2023/081197 Invitation to Pay Additional Fees dated Feb. 8, 2024.

Tongwei Guan, ed. Microbiology, China Light Industry Press, pp. 110-112 (2018). With machine translation.

EP21774056.2 Extended European Search Report dated Apr. 3, 2024.

Kyriakopoulou, Konstantina, et al. Plant-Based Meat Analogues. Sustainable Meat Production and Processing. (2019):103-126. Retrieved from URL: https://doi.org/10.1016/B978-0-12-814874-7.00006-7.

PCT/US2023/081197 International Search Report and Written Opinion dated Apr. 4, 2024.

U.S. Appl. No. 17/363,465 Office Action dated Jun. 5, 2024.

Bongers. Energy Generation and Utilization in Hydrogen Bacteria. Journal of Bacteriology, vol. 104, No. 1, pp. 145-151 (Oct. 1970).

EP21743721.9 Extended European Search Report dated Jul. 9, 2024.

Fasihi et al., Techno-economic assessment of CO2 direct air capture plants. Journal of Cleaner Production 224:957-980 (2019).

Huijgen et al. Carbon dioxide sequestration by mineral carbonation. Literature Review. 2003. Retrieved at URL: https://www.researchgate.net/profile/Wouter-Huijgen/publication/40111028_Carbon_Dioxide_Sequestration_by_Mineral_Carbonation/links/0046352f9fdd070ac0000000/Carbon-Dioxide-Sequestration-by-Mineral-Carbonation.pdf?_tp=eyJjb250ZXh0Ijp7ImZpcnNOUGFnZSI6II9kaXJlY3QiLCJwYWdlIjoicHVibGljYXRpb24iLCJwcmV2aW91c1BhZ2UiOiJfZGlyZWN0In19. 52 pages.

Keith et al., A process for capturing CO2 from the atmosphere. CellPress; Joule 2(8):1573-1594 (2018).

Okamoto, Yuta. et al. Mammalian Cell Cultivation Using Nutrients Extracted from Microalgae. Biotechnology Progress 36(2):e2941, 1-9 (2020). Published online Dec. 9, 2019.

(56) References Cited

OTHER PUBLICATIONS

Siemensma, André, et al. Towards an understanding of how protein hydrolysates stimulate more efficient biosynthesis in cultured cells. Protein hydrolysates in biotechnology:1-19 (1970).

U.S. Appl. No. 17/362,998 Office Action dated Sep. 4, 2024.

U.S. Appl. No. 17/363,465 Office Action dated Oct. 15, 2024.

U.S. Appl. No. 17/908,104 Restriction Requirement dated Nov. 14, 2024.

Veers et al, Grand Challenges in the Science of Wind Energy. Review Summary. Science 366:443 (2019).

U.S. Appl. No. 17/363,465 Corrected Notice of Allowability dated Aug. 11, 2025.

Co-pending U.S. Appl. No. 19/212,168, inventors Reed; John S. et al., filed May 19, 2025.

Co-pending U.S. Appl. No. 19/272,946, inventor Dyson; Lisa, filed Jul. 17, 2025.

Reedy, Charles J. et al. Development of a heme protein structure-electrochemical function database. Nucleic acids research 36(Database issue):D307-D313 (2008) Published online Oct. 11, 2007.

U.S. Appl. No. 17/362,998 Office Action dated Jun. 16, 2025.

U.S. Appl. No. 17/363,465 Notice of Allowance dated Jun. 6, 2025.

U.S. Appl. No. 17/908,104 Office Action dated Jun. 26, 2025.

Co-pending U.S. Appl. No. 19/418,416, inventors Reed; John et al., filed Dec. 12, 2025.

* cited by examiner

STRUCTURED HIGH-PROTEIN MEAT ANALOGUE COMPOSITIONS

CROSS-REFERENCE TO RELATED APPLICATIONS

This application is a continuation-in-part of PCT Application No. PCT/US2021/20147, filed on Feb. 28, 2021, which claims the benefit of U.S. Provisional Application No. 62/984,253, filed on Mar. 2, 2020, both of which are incorporated herein by reference in their entireties.

FIELD OF THE INVENTION

The present invention relates to structured food compositions that include protein products from microorganisms, such as structured meat analogue compositions that are suitable for human or animal consumption and which closely mimic the properties of meat and function as meat analogue products.

BACKGROUND

Eating meat derived from animal sources is a part of everyday life for many people. Adverse impacts of a meat-based diet on human health and on the environment have been well documented. There is a growing consumer demand for alternative protein-rich foods that are not derived from animals but that provide similar textural and flavor characteristics of animal meat, and similar functional properties of animal meat, without unhealthy components associated with meat, such as saturated fatty acids and cholesterol, and without the harmful environmental effects of animal agriculture.

BRIEF SUMMARY OF THE INVENTION

Structured food products, such as structured meat products, e.g., structured meat analogue products, and methods of producing such products, are disclosed herein.

In one aspect, a structured food product, including a protein product from a microorganism, is provided. In some embodiments, the microorganism comprises or consists of one or more chemoautotrophically grown microorganism. In one embodiment, the microorganism, e.g., chemoautotrophically grown microorganism, comprises or consists of a *Cupriavidus* microorganism.

In some embodiments, the structured food product includes a protein product derived from a first microorganism grown on a nutritional source that includes a protein product from a second microorganism. In one embodiment, the second microorganism comprises or consists of a *Cupriavidus* microorganism. For example, the first microorganism may be a generally recognized as safe (GRAS) microorganism, and optionally, the second microorganism may be a microorganism that is not GRAS.

In some embodiments, the structured food product includes a protein product from a microorganism that is a non-genetically modified organism (non-GMO). In some embodiments, the structured food product does not contain animal-derived biomolecules, such as animal-derived proteins, lipids, and/or carbohydrates.

In some embodiments, the structured food product includes a protein product that includes one or more of single cell protein, cell lysate, protein isolate, protein extract, protein hydrolysate, free amino acids, peptides, oligopeptides, or combinations thereof, from one or more microorganisms. In one embodiment, the protein product comprises or consists of a protein hydrolysate from one or more microorganisms. In some embodiments, the structured food product includes at least about 5% to about 50%, or about 10% to about 50%, or about 20% to about 50%, or about 30% to about 50% protein by weight from the microorganism protein product.

In some embodiments, the structured food product includes a non-animal protein ingredient comprising or consisting of single cell protein, cell lysate, protein isolate, protein extract, protein hydrolysate, free amino acids, peptides, oligopeptides, or combinations thereof, wherein such protein ingredient provides one or more beneficial functional properties to the structured food product.

In some embodiments, the structured food product is a structured meat analogue product, such as, but not limited to, a structured beef, poultry, pork, fish, lamb or seafood analogue product. For example, the structured meat analogue product may reproduce a texture and/or organoleptic characteristic of natural meat. In some embodiments, the meat analogue product mimics the structure of ground or muscle meat. In certain embodiments, the structured meat analogue product includes one or more flavorant, such as a flavohemoprotein flavorant. In an embodiment, the structured meat analogue includes a flavohemoprotein flavorant that is produced by the microorganism. In some embodiments, the structured meat analogue product includes a protein product that is derived from a chemoautotrophically grown microorganism, or derived from a microorganism that is grown in a medium that includes a protein product derived from a chemoautotrophically grown microorganism. In one embodiment, the chemoautotrophically grown microorganism comprises or consists of a *Cupriavidus* microorganism.

In some embodiments, the structured food product, such as, but not limited to, a structured meat analogue product, is supplemented with one or more substance, such as vitamin, nutrient, or substance with a beneficial functional property. For example, the supplemental substance(s) may include one or more of amino acids, lipids, oils, fatty acids, vitamin $B_{12}$ or other vitamins, biotin, antioxidants, minerals, surfactants, and emulsifiers.

In another aspect, a dough composition is provided, for production of a structured food product as described herein, e.g., a structured food product that includes a protein product from a microorganism. In some embodiments, the microorganism comprises or consists of one or more chemoautotrophically grown microorganism. In one embodiment, the microorganism, e.g., chemoautotrophically grown microorganism, comprises or consists of a *Cupriavidus* microorganism.

In some embodiments, the dough composition includes a protein product derived from a first microorganism grown on a nutritional source that includes a protein product from a second microorganism. In one embodiment, the second microorganism comprises or consists of a *Cupriavidus* microorganism. For example, the first microorganism may be a generally recognized as safe (GRAS) microorganism, and optionally, the second microorganism may be a microorganism that is not GRAS.

In some embodiments, the dough composition includes a protein product from a microorganism that is a non-genetically modified organism (non-GMO). In some embodiments, the dough composition does not contain animal-derived biomolecules, such as animal-derived proteins, lipids, and/or carbohydrates.

In some embodiments, the dough composition includes a protein product that includes one or more of single cell protein, cell lysate, protein isolate, protein extract, protein hydrolysate, free amino acids, peptides, oligopeptides, or combinations thereof, from one or more microorganism. In one embodiment, the protein product comprises or consists of a protein hydrolysate from one or more microorganism. For example, the average molecular weight of proteins in the hydrolysate may be about 5 kD to about 10 kD. In certain embodiments, the dough composition includes a protein hydrolysate that is produced under conditions that retain undenatured globular protein, such as, for example, mild cell lysis and physical separation of soluble materials (e.g., proteins) from solid materials (e.g., cell debris).

In some embodiments, the dough composition, e.g., including partially or fully hydrolyzed protein product derived from one or more microorganism, is added to a second protein product, to promote structuring and/or fiber formation. Non-limiting examples of the second protein product include one or more of wheat gluten, soy, pea, wheat, milk, algae, and other non-animal proteins.

In some embodiments, the water content of the dough composition is about 40% (w/w) to about 80% (w/w). In some embodiments, the shear strength of the dough is at least about 1000 psig.

In another aspect, a method for producing a structured food product, e.g., a structured meat analogue product, is provided. The method includes: (a) culturing a microorganism in the presence of a carbon source, thereby producing protein-containing biomass; (b) converting the biomass into a protein product; and (c) processing the protein product into a structured food composition.

In some embodiments, step (a) includes chemoautotrophic culture conditions. For example, the chemoautotrophic culture conditions may include a gaseous C1 molecule, such as $CO_2$, as a carbon source. In some embodiments, the microorganism grown under chemoautotrophic culture conditions comprises or consists of a *Cupriavidus* microorganism.

In some embodiments, the protein product produced in step (b) includes one or more of single cell protein, cell lysate, protein isolate, protein extract, protein hydrolysate, free amino acids, peptides, oligopeptides, or combinations thereof.

In some embodiments, step (c) includes processing the protein product into a dough composition. For example, a thermochemical process may be deployed, such as extrusion. In some embodiments, step (c) may include a spinning process, resulting in production of fibers. In some embodiments, step (c) may include formation of a structured hydrocolloid.

In some embodiments, the structured food product produced in step (c) is a structured meat analogue product, such as a structured beef, poultry, pork, fish, or seafood analogue product. For example, the structured meat analogue product may reproduce a texture and/or organoleptic characteristic of natural meat. In some embodiments, the meat analogue product mimics the structure of ground or muscle meat. In certain embodiments, the structured meat analogue product includes one or more flavorant, such as a flavohemoprotein flavorant. In an embodiment, the structured meat analogue includes a flavohemoprotein flavorant that is produced by the microorganism. In some embodiments, the structured meat analogue product includes a protein product that is derived from a chemoautotrophically grown microorganism, or derived from a microorganism that is grown in a medium that includes a protein product derived from a chemoautotrophically grown microorganism. In one embodiment, the chemoautotrophically grown microorganism comprises or consists of a *Cupriavidus* microorganism.

In another aspect, a thermochemical process is provided for processing a dough composition as described herein into a structured meat analogue composition. The thermochemical process includes extruding the dough composition, which includes a protein product derived from one or more microorganism, as described herein, to produce aligned fibers. In some embodiments, the protein product comprises or consists of a protein hydrolysate. In some embodiments, the microorganism from which the protein product is derived is a chemoautotrophically grown microorganism or a microorganism that is grown in a medium that includes a protein product derived from a chemoautotrophically grown microorganism. For example, the chemoautotrophically grown microorganism may comprise or consist of a *Cupriavidus* microorganism.

DETAILED DESCRIPTION

Figure 1:
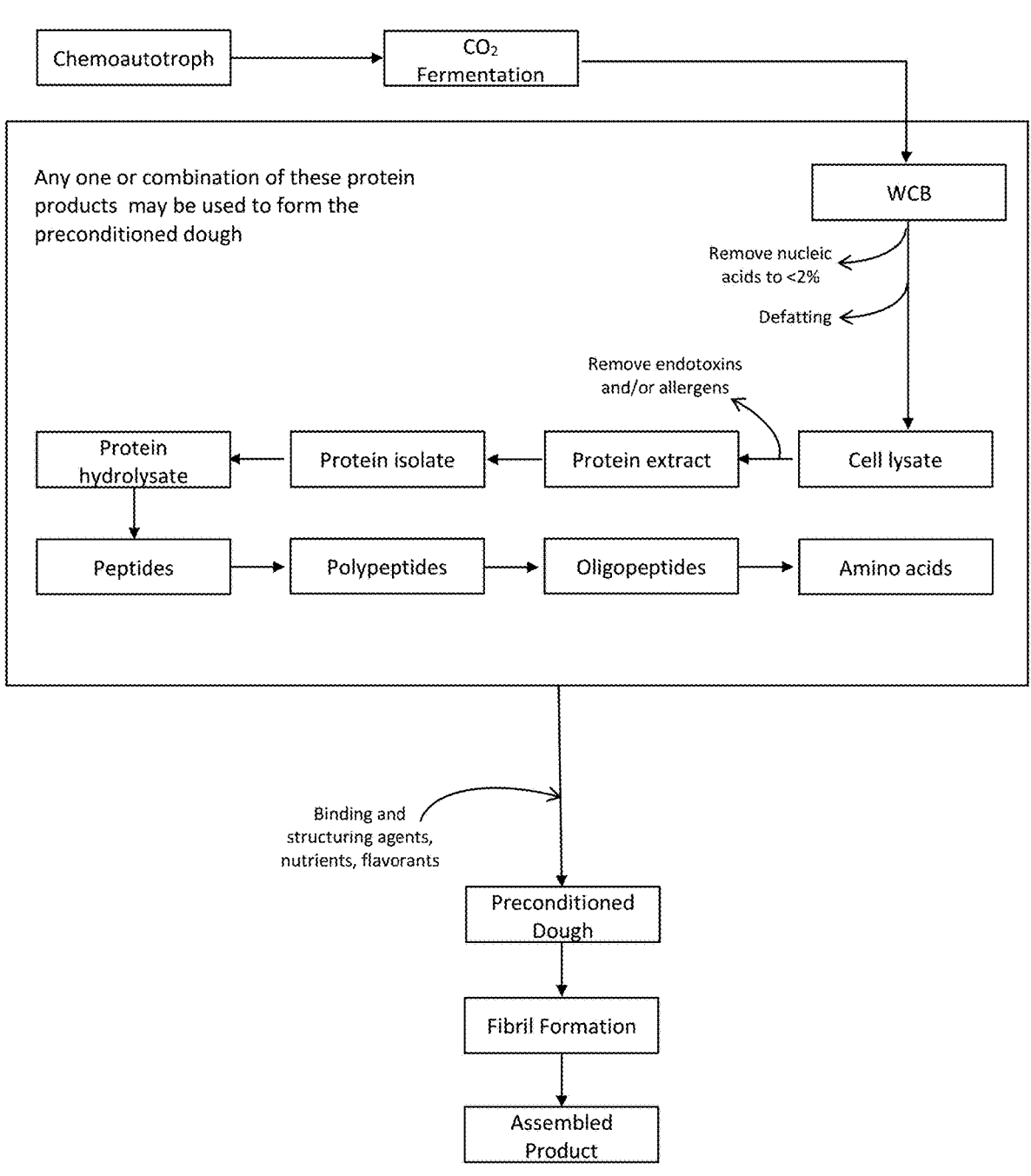
FIG. 1 shows an exemplary, non-limiting workflow of an embodiment of production of a structured food product as described herein. WCB=whole cell biomass

Provided herein are structured food compositions and methods of making the same. The structured food compositions described herein, including structured meat analogue compositions, include protein products (e.g., protein products that comprise or consist of protein hydrolysate) that are produced by microorganisms. For example, the microorganisms from which the protein products are derived may be chemoautotrophically grown, for example, on a gaseous C1 substrate as a carbon source.

Definitions

Unless defined otherwise herein, all technical and scientific terms used herein have the same meaning as commonly understood by one of ordinary skill in the art to which this invention belongs. Singleton, et al., Dictionary of Microbiology and Molecular Biology, second ed., John Wiley and Sons, New York (1994), and Hale & Markham, The Harper Collins Dictionary of Biology, Harper Perennial, NY (1991) provide one of skill with a general dictionary of many of the terms used in this invention. Any methods and materials similar or equivalent to those described herein can be used in the practice or testing of the methods, systems, and compositions described herein.

The practice of the present invention will employ, unless otherwise indicated, conventional techniques of molecular biology (including recombinant techniques), microbiology, cell biology, and biochemistry, which are within the skill of the art. Such techniques are explained fully in the literature, for example, Molecular Cloning: A Laboratory Manual, second edition (Sambrook et al., 1989); Oligonucleotide Synthesis (M. J. Gait, ed., 1984; Current Protocols in Molecular Biology (F. M. Ausubel et al., eds., 1994); PCR:

The Polymerase Chain Reaction (Mullis et al., eds., 1994); and Gene Transfer and Expression: A Laboratory Manual (Kriegler, 1990).

Numeric ranges provided herein are inclusive of the numbers defining the range.

Unless otherwise indicated, nucleic acids are written left to right in 5' to 3' orientation; amino acid sequences are written left to right in amino to carboxy orientation, respectively.

"A," "an" and "the" include plural references unless the context clearly dictates, thus the indefinite articles "a", "an,", and "the" as used herein in the specification and in the claims, unless clearly indicated to the contrary, should be understood to mean "at least one."

The term "about" as used herein when referring to a measurable value such as an amount, a temporal duration, and the like, is meant to encompass variations of ±5%, ±1%, or ±0.1% from the specified value, as such variations are appropriate to perform the disclosed methods or in connection with a disclosed composition.

"Acetogen" refers to a microorganism that generates acetate and/or other short chain organic acids up to C4 chain length as a product of anaerobic respiration.

"Acidophile" refers to a type of extremophile that thrives under highly acidic conditions (usually at pH 2.0 or below).

The term "amino acid" refers to a molecule containing both an amine group and a carboxyl group that are bound to a carbon, which is designated the alpha-carbon. Suitable amino acids include, without limitation, both the D- and L-isomers of the naturally occurring amino acids, as well as non-naturally occurring amino acids prepared by organic synthesis or other metabolic routes. In some embodiments, a single "amino acid" might have multiple sidechain moieties, as available per an extended aliphatic or aromatic backbone scaffold. Unless the context specifically indicates otherwise, the term amino acid, as used herein, is intended to include amino acid analogs.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The term "biomass" refers to a material produced by growth and/or propagation of cells, e.g., microorganism cells. Biomass may contain cells and/or intracellular contents as well as extracellular material, including, but not limited to, compounds secreted by a cell.

The term "bioreactor" or "fermenter" refers to a closed or partially closed vessel in which cells, e.g., microorganism cells, are grown and maintained. The cells may be, but are not necessarily, held in liquid suspension. In some embodiments, rather than being held in liquid suspension, cells may alternatively be grown and/or maintained in contact with, on, or within another non-liquid substrate including but not limited to a solid growth support material.

The term "carbon fixing" process, reaction or pathway refers to enzymatic reactions or metabolic pathways that convert forms of carbon that are gaseous under ambient conditions, including but not limited to $CO_2$, CO, and $CH_4$, into carbon-based biochemicals that are liquid or solid under ambient conditions, or which are dissolved into, or held in suspension in, aqueous solution.

"Carbon source" refers to the types of molecules from which a microorganism derives the carbon needed for organic biosynthesis.

"Carboxydotrophic" refers to microorganisms that can tolerate or oxidize carbon monoxide. In preferred embodiments a carboxydotrophic microorganism can utilize CO as a carbon source and/or as a source of reducing electrons for biosynthesis and/or respiration.

"Chemoautotrophic" refers to organisms that obtain energy by the oxidation of chemical electron donors by chemical electron acceptors and synthesize all the organic compounds needed by the organism to live and grow from carbon dioxide.

In the claims, as well as in the specification, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

A "consortium" refers herein to two or more different species or strains of microorganisms and/or multi-cellular organisms, which are grown together, for example, grown in co-culture in the same growth medium.

The term "culturing" refers to growing a population of cells, e.g., microbial cells, under suitable conditions for growth, in a liquid or solid medium.

The term "derived from" encompasses the terms "originated from," "obtained from," "obtainable from," "isolated from," and "created from," and generally indicates that one specified material finds its origin in another specified material or has features that can be described with reference to another specified material.

The term "dough" as used herein refers to a blend of dry ingredients ("dry mix"; e.g., proteins, carbohydrates, and lipids including liquid oils) and liquid ingredients ("liquid mix"; e.g., water or juice, such as a liquid based extract from a non-animal source such as a plant or any part of a plant). The dough may also include one or more additional protein product with structural and/or functional properties that impart or enhance the structuring quality of the dough, e.g., in a shear process.

"Energy source" refers to either the electron donor that is oxidized by oxygen in aerobic respiration or the combination of electron donor that is oxidized and electron acceptor that is reduced in anaerobic respiration.

"Extremophile" refers to a microorganism that thrives in physically or geochemically extreme conditions (e.g., high or low temperature, pH, or high salinity) compared to conditions on the surface of the Earth or the ocean that are typically tolerated by most life forms found on or near the earth's surface.

The term "functional properties," "functional characteristics," or "functionality" or similar descriptors refers to how food ingredients behave during preparation and cooking, and how they affect the finished food product in terms of how it looks, tastes, feels, and handles. Functional properties can include water absorption, water solubility, oil absorption indexes, expansion index, bulk density, viscosity, binding, aeration, thickening, setting, adding color, dextrinization, caramelization, jelling, denaturation, coagulation, emulsion capacity or emulsion stability.

The term "gasification" refers to a generally high temperature process that converts carbon-based materials into a mixture of gases including hydrogen, carbon monoxide, and carbon dioxide called synthesis gas, syngas or producer gas. The process generally involves partial combustion and/or the application of externally generated heat along with the controlled addition of oxygen and/or steam such that insufficient oxygen is present for complete combustion of the carbon-based material.

"Halophile" refers to a type of extremophile that thrives in environments with very high concentrations of salt.

"Heterotrophic" refers to organisms that cannot synthesize all the organic compounds needed by the organism to live and grow from carbon dioxide, and which must utilize organic compounds for growth. Heterotrophic organisms cannot produce their own food and instead obtain food and energy by taking in and metabolizing organic substances, such as plant or animal matter, i.e., rather than fixing carbon from inorganic sources such as carbon dioxide.

"Hydrogen-oxidizer" refers to a microorganism that utilizes reduced $H_2$ as an electron donor for the production of intracellular reducing equivalents and/or in respiration.

"Hyperthermophile" refers to a type of extremophile that thrives in extremely hot environments for life, typically about 60° C. (140° F.) or higher.

The term "knallgas" refers to the mixture of molecular hydrogen and oxygen gas. A "knallgas microorganism" is a microbe that can use hydrogen as an electron donor and oxygen as an electron acceptor in respiration for the generation of intracellular energy carriers such as Adenosine-5'-triphosphate (ATP). The terms "oxyhydrogen" and "oxyhydrogen microorganism" can be used synonymously with "knallgas" and "knallgas microorganism," respectively. Knallgas microorganisms generally use molecular hydrogen by means of hydrogenases, with some of the electrons donated from $H_2$ that is utilized for the reduction of $NAD^+$ (and/or other intracellular reducing equivalents) and some of the electrons from $H_2$ that is used for aerobic respiration. Knallgas microorganisms generally fix $CO_2$ autotrophically, through pathways including but not limited to the Calvin Cycle or the reverse citric acid cycle ["Thermophilic bacteria", Jakob Kristjansson, Chapter 5, Section III, CRC Press, (1992)].

The term "lipid" herein refers to one or more molecules (e.g., biomolecules) that include a fatty acyl group (e.g., saturated or unsaturated acyl chains). For example, the term lipids includes oils, phospholipids, free fatty acids, monoglycerides, diglycerides, and triglycerides.

The term "lysate" refers to the liquid containing a mixture and/or a solution of cell contents that result from cell lysis, e.g., microorganism cell lysis. In some embodiments, the methods described herein comprise a purification of chemicals or mixture of chemicals in a cellular lysate. In some embodiments, the methods comprise a purification of amino acids and/or protein in a cellular lysate.

The term "lysis" refers to the rupture of the plasma membrane and if present, the cell wall of a cell, e.g., microorganism cell, such that a significant amount of intracellular material escapes to the extracellular space. Lysis can be performed using electrochemical, mechanical, osmotic, thermal, or viral means. In some embodiments, the methods described herein comprise performing a lysis of cells or microorganisms as described herein in order to separate a chemical or mixture of chemicals from the contents of a bioreactor. In some embodiments, the methods comprise performing a lysis of cells or microorganisms described herein in order to separate an amino acid or mixture of amino acids and/or proteins from the contents of a bioreactor or cellular growth medium.

The term "meat analogue" or "meat substitute" or "imitation meat" or "meat analogue" as used herein refers to a food product that is not derived from an animal, or that contains a substantial amount of non-animal protein source, but has structure, texture, aesthetic qualities, and/or other properties comparable or similar to those of animal meat. The term refers to uncooked, cooking, and cooked meat-like food product.

"Methanogen" refers to a microorganism that generates methane as a product of anaerobic respiration.

"Methylotroph" refers to a microorganism that can use reduced one-carbon compounds, such as but not limited to methanol or methane, as a carbon source and/or as an electron donor for their growth.

The terms "microorganism" and "microbe" mean microscopic single celled life forms, such as bacterial and fungal microorganisms.

The term "molecule" means any distinct or distinguishable structural unit of matter comprising one or more atoms, and includes for example hydrocarbons, lipids, polypeptides and polynucleotides.

"Oligopeptide" refers to a peptide that contains a relatively small number of amino-acid residues, for example, about 2 to about 20 amino acids.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

The term "organic compound" refers to any gaseous, liquid, or solid chemical compound that contains carbon atoms, with the following exceptions that are considered inorganic: carbides, carbonates, simple oxides of carbon, cyanides, and allotropes of pure carbon such as diamond and graphite.

"Peptide" refers to a compound (a polypeptide) consisting of two or more amino acids linked in a chain, the carboxyl group of each acid being joined to the amino group of the next by a bond of the type R—OC—NH—R', for example, about 2 amino acids to about 50 amino acids, or 21 amino acids to about 50 amino acids.

As used herein, the term "polynucleotide" refers to a polymeric form of nucleotides of any length and any three-dimensional structure and single- or multi-stranded (e.g., single-stranded, double-stranded, triple-helical, etc.), which contain deoxyribonucleotides, ribonucleotides, and/or analogs or modified forms of deoxyribonucleotides or ribonucleotides, including modified nucleotides or bases or their analogs. Because the genetic code is degenerate, more than one codon may be used to encode a particular amino acid, and the present invention encompasses polynucleotides which encode a particular amino acid sequence. Any type of modified nucleotide or nucleotide analog may be used, so long as the polynucleotide retains the desired functionality under conditions of use, including modifications that increase nuclease resistance (e.g., deoxy, 2'-O-Me, phosphorothioates, etc.). Labels may also be incorporated for purposes of detection or capture, for example, radioactive or nonradioactive labels or anchors, e.g., biotin. The term polynucleotide also includes peptide nucleic acids (PNA). Polynucleotides may be naturally occurring or non-naturally occurring. The terms "polynucleotide," "nucleic acid," and "oligonucleotide" are used herein interchangeably. Polynucleotides may contain RNA, DNA, or both, and/or modified forms and/or analogs thereof. A sequence of nucleotides may be interrupted by non-nucleotide components. One or more phosphodiester linkages may be replaced by alternative linking groups. These alternative linking groups include, but are not limited to, embodiments wherein phosphate is replaced by P(O)S ("thioate"), P(S)S ("dithioate"), (O)NR.sub.2 ("amidate"), P(O)R, P(O)OR', CO or CH.sub.2 ("formacetal"), in which each R or R' is independently H or substituted or unsubstituted alkyl (1-20 C) optionally containing an ether (—O—) linkage, aryl, alkenyl, cycloalkyl, cycloalkenyl or araldyl. Not all linkages in a polynucleotide need be identical. Polynucleotides may be linear or circular or comprise a combination of linear and circular portions.

As used herein, "polypeptide" refers to a composition comprised of amino acids and recognized as a protein by those of skill in the art. The conventional one-letter or three-letter code for amino acid residues is used herein. The terms "polypeptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also, included within the definition are, for example, polypeptides containing one or more analogs of an amino acid (including, for example, unnatural amino acids, etc.), as well as other modifications known in the art.

The term "precursor to" or "precursor of" is an intermediate towards the production of one or more of the components of a finished product.

"Producer gas" refers to a gas mixture containing various proportions of $H_2$, CO, and $CO_2$, and having heat value typically ranging between one half and one tenth that of natural gas per unit volume under standard conditions. Producer gas can be generated various ways from a variety of feedstocks, including gasification, steam reforming, or autoreforming of carbon-based feedstocks. In addition to $H_2$, CO, and $CO_2$, producer gases can contain other constituents including but not limited to methane, hydrogen sulfide, condensable gases, tars, and ash depending upon the generation process and feedstock. The proportion of $N_2$ in the mixture can be high or low depending whether air is used as an oxidant in the reactor or not and if the heat for the reaction is provided by direct combustion or through indirect heat exchange.

The term "producing" includes both the production of compounds intracellularly and extracellularly, including the secretion of compounds from the cell.

"Psychrophile" refers to a type of extremophile capable of growth and reproduction in cold temperatures, typically about 10° C. and lower.

The terms "recovered," "isolated," "purified," and "separated" as used herein refer to a material (e.g., a protein, nucleic acid, or cell) that is removed from at least one component with which it is naturally associated. For example, these terms may refer to a material that is substantially or essentially free from components which normally accompany it as found in its native state, such as, for example, an intact biological system.

The term "structured meat product" or "structured meat analogue product" or "meat structured protein product" as used herein refers to a product that includes protein fiber networks and/or aligned protein fibers that produce meat-like textures, with optional post-processing after the fibrous and/or aligned structure is generated and fixed (e.g., hydrating, marinating, drying, coloring). Methods for determining the degree of protein fiber network formation and/or protein fiber alignment are known in the art and include visual determination based upon photographs and micrographic images, as exemplified, for example, in U.S. Publication No. 2015/0296834A1, filed Apr. 15, 2015, which is incorporated by reference herein.

The phrase "substantially free" or "essentially free" as to any given component means that such component is only present, if at all, in an amount that is a functionally insignificant amount, i.e., it does not significantly negatively impact the intended performance or function of any process or product. Typically, substantially free means less than about 1%, including less than about 0.5%, including less than about 0.1%, and also including zero percent, by weight of such component. The terms "substantially free" or "essentially free" shall me less than 1% of a component.

"Sulfur-oxidizer" refers to microorganisms that utilize reduced sulfur containing compounds including but not limited to $H_2S$ as electron donors for the production of intracellular reducing equivalents and/or in respiration.

"Syngas" or "Synthesis gas" refers to a type of gas mixture, which like producer gas contains $H_2$ and CO, but which has been more specifically tailored in terms of $H_2$ and CO content and ratio and levels of impurities for the synthesis of a particular type of chemical product, such as but not limited to methanol or fischer-tropsch diesel. Syngas generally contains $H_2$, CO, and $CO_2$ as major components, and it can be generated through established methods including: steam reforming of methane; or through gasification of any organic, flammable, carbon-based material, including but not limited to biomass, organic matter, or peat. The hydrogen component of syngas can be increased through the reaction of CO with steam in the water gas shift reaction, with a concomitant increase in $CO_2$ in the syngas mixture.

"Thermophile" refers to a type of extremophile that thrives at relatively high temperatures for life, typically about 45° C. to about 122° C.

"Wild-type" refers to a microorganism as it occurs in nature.

"Yield" refers to amount of a product produced from a feed material relative to the total amount of the substance that would be produced if all of the feed substance were converted to product. For example, yield of the product may be expressed as % of the product produced relative to a theoretical yield if 100% of the feed substance were converted to the product.

Structured Food Products

Structured food products are provided herein. The structured food products include a microbially-derived protein product. The protein product is derived from a microorganism, such as a bacterial or fungal microorganism. Structured food products encompass food structures that are formed when food ingredients are mixed together and processed to make a food product, i.e., an edible product for human or animal consumption.

In some embodiments, the microorganism is a chemoautotrophically grown microorganism, such as a microorganism grown on a gaseous C1 carbon source, such as $CO_2$, $CO$, or $CH_4$, or is a microorganism that is grown in a medium that includes a protein product derived from a chemoautotrophically grown microorganism. The chemoautotrophic microorganism may be any chemoautotrophic microorganism described herein, infra. IN certain non-limiting embodiments, the chemoautotrophic microorganism is a *Cupriavidus* microorganism, such as *Cupriavidus necator* or *Cupriavidus metallidurans*.

In some embodiments, the microorganism is a GRAS microorganism, such as any of the GRAS microorganisms described herein, infra, such as a lactic acid bacterium (LAB). In certain embodiments, the GRAS microorganism is grown in a medium that includes protein product derived from a non-GRAS microorganism. The non-GRAS microorganism may be, for example, a chemoautotrophically grown microorganism, such as, for example, a *Cupriavidus* microorganism, such as *Cupriavidus necator* or *Cupriavidus metallidurans*.

The microbially-derived protein product ("protein product") in the structured food product may include one or more of single cell protein, cell lysate, protein isolate, protein extract, protein hydrolysate, free amino acids, peptides, and oligopeptides. The protein product, e.g., any of the protein products described herein, may be included in the structured food composition in an amount any of at least about 5% (w/w), 10% (w/w), 15% (w/w), 20% (w/w), 25% (w/w), 30% (w/w), 35% (w/w), 40% (w/w), 45% (w/w), 50% (w/w), 55% (w/w), 60% (w/w), 65% (w/w), or 70% (w/w). In some embodiments, the content of microbially-derived protein content of the structured food product is any of about 5% (w/w) to about 50% (w/w), about 5% (w/w) to about 10% (w/w), about 10% (w/w) to about 15% (w/w), about 15% (w/w) to about 20% (w/w), about 20% (w/w) to about 25% (w/w), about 25% (w/w) to about 30% (w/w), about 30% (w/w) to about 35% (w/w), about 35% (w/w) to about 40% (w/w), about 40% (w/w) to about 45% (w/w), about 45% (w/w) to about 50% (w/w), about 5% (w/w) to about 15% (w/w), about 10% (w/w) to about 20% (w/w), 15% (w/w) to about 25% (w/w), about 20% (w/w) to about 30% (w/w), about 25% (w/w) to about 35% (w/w), about 30% (w/w) to about 40% (w/w), about 35% (w/w) to about 40% (w/w), about 40% (w/w) to about 50% (w/(w/w)w), about 5% (w/w) to about 25% (w/w), about 20% (w/w) to about 40% (w/w), or about 25% to about 50% (w/w). The protein product may comprise at least about 5% (w/w) to about 50% (w/w) single cell protein, at least about 5% (w/w) to about 50% (w/w) cell lysate, at least about 5% (w/w) to about 50% (w/w) protein extract, at least about 5% (w/w) to about 50% (w/w) protein isolate, at least about 5% (w/w) to about 50% (w/w) protein hydrolysate, at least about 5% (w/w) to about 50% (w/w) free amino acids, at least about 5% (w/w) to about 50% (w/w) peptides, at least about 5% (w/w) to about 50% (w/w) oligopeptides, at least about 25% (w/w) to about 0% (w/w) single cell protein, at least about 25% (w/w) to about 80% (w/w) cell lysate, at least about 25% (w/w) to about 80% (w/w) protein extract, at least about 25% (w/w) to about 80% (w/w) protein isolate, at least about 25% (w/w) to about 80% (w/w) protein hydrolysate, at least about 25% (w/w) to about 80% (w/w) free amino acids, at least about 25% (w/w) to about 80% (w/w) peptides, at least about 25% (w/w) to about 80% (w/w) oligopeptides, at least about 75%

(w/w) to about 100% (w/w) single cell protein, at least about 75% (w/w) to about 100% (w/w) cell lysate, at least about 75% (w/w) to about 100% (w/w) protein extract, at least about 75% (w/w) to about 100% (w/w) protein isolate, at least about 75% (w/w) to about 100% (w/w) protein hydrolysate, at least about 75% (w/w) to about 100% (w/w) free amino acids, at least about 75% (w/w) to about 100% (w/w) peptides, and/or at least about 75% (w/w) to about 100% (w/w) oligopeptides.

A structured food product as described herein may be an analogue of a natural food product, and may include rheological and structural (geometric and surface) attributes of a food product, such as attributes perceptible by means of mechanical, tactual and/or visual receptors. Food structure attributes include, for example: adhesive, bouncy, brittle, bubbly, chewy, clingy, coating, cohesive, creamy, crisp, crumbly, crusty, dense, doughy, dry, elastic, fatty, firm, flaky, fleshy, fluffy, foamy, fragile, full-bodied, gooey, grainy, gritty, gummy, hard, heavy, heterogeneous, juicy, lean, light, limp, lumpy, moist, mouth-coating, mushy, oily, pasty, plastic, porous, powdery, puffy, pulpy, rich, rough, rubbery, runny, sandy, scratchy, etc.

In some embodiments, the structured food product is a meat analogue product, e.g., structured to resemble in texture or appearance, a natural meat product derived from an animal. For example, the meat analogue product may be any of a beef, poultry (e.g., chicken, turkey, duck), pork, fish, or seafood analogue product. The meat analogue product may be in the form of a natural meat product, such as a burger, a nugget, etc., and may reproduce a texture and/or organoleptic (i.e., involving one or more sense organ) characteristic of a natural meat product.

The meat analogue product may mimic the structure of natural ground or muscle meat. Muscle meat is naturally structured by individual myocytes assembled into anisotropic fibers. Fibrous material processes using a microbial protein product as descried herein may result in a three-dimensional mimic of natural meat architecture. The structuring methods include, but are not limited to, self-assembly, forced assembly, or a combination, and directed self-assembly.

In some embodiments, the protein fibers are substantially aligned. Protein fiber networks and/or protein fiber alignments may impart cohesion and firmness, whereas open spaces in the protein fiber networks and/or protein fiber alignments may tenderize the meat structured protein products and provide pockets for capturing water, carbohydrates, salts, lipids, flavorings, and other materials that are slowly released during chewing to lubricate the shearing process and to impart other meat-like sensory characteristics.

The structured food product, e.g., structured meat analogue product, may include one or more flavorant. In certain embodiments, a structured food product, e.g., structured meat product, may include a flavohemoprotein flavorant. In an embodiments, the flavohemoprotein is produced by the microorganism from which the protein product is derived. In one embodiment, the flavohemoprotein and the protein product are produced by a *Cupriavidus* microorganism, such as *Cupriavidus necator* or *Cupriavidus metallidurans*.

In some embodiments, the structured food product, e.g., structured meat analogue product, includes one or more supplemental vitamins, nutrients, or functional substance (i.e., supplemented into the formulation (e.g., dough) for production of the structured food product or into the growth medium for the microorganism from which the protein product is derived, or may be produced by the microorganism from which the protein product is derived. Nonlimiting examples of such supplements include amino acids (e.g., essential amino acids), lipid, oils, fatty acids, vitamins (e.g., vitamin $B_{12}$, biotin, other essential vitamins), antioxidants, minerals, surfactants, and emulsifiers.

In some embodiments, the microorganism from which the protein product that is incorporated into the structured food composition, e.g., structured meat analogue composition, is non-GMO.

In some embodiments, the structured food composition, e.g., structured meat analogue composition, does not include animal derived material or substances, such as animal-derived biomolecules or biochemicals. In some embodiments, for example, in a meat substitute or meat analogue product, a hydrogel, lipogel, and/or emulsion is included in the composition, for example, as an agent release system (e.g., for release of a coloring agent, a flavor agent, a fatty acid, a leavening agent, a gelling agent (e.g., bicarbonate (e.g., potassium bicarbonate), calcium hydroxide, and/or alginate (e.g., sodium or potassium alginate)) wherein the agent(s) may be released during cooking of the food product to simulate animal meat).

In some embodiments, the structured food product includes one or more plant protein source such as, but not limited to, pea, rice, glutinous rice, wheat, gluten, soy, hemp, canola, insects, algae, and/or buckwheat, in combination with a protein product produced by microorganisms as described herein (e.g., one or more of single cell protein, cell lysate, protein isolate, protein extract, protein hydrolysate, free amino acids, peptides, oligopeptides, or combinations thereof), wherein the protein product imparts a flavor to the food composition, such as, for example, a meat-like flavor.

In some embodiments, a food product, for example, a meat substitute or meat analogue product, includes a heme compound, such as a heme-containing polypeptide. In one embodiment, the food product includes heme (e.g., heme-containing polypeptide) from the microorganism from which the protein product is derived.

In some embodiments, a structured meat analogue product (e.g., a beef, poultry, pork, fish, or seafood analogue product) includes a protein product produced by microorganisms as described herein (e.g., one or more of single cell protein, cell lysate, protein isolate, protein extract, protein hydrolysate, free amino acids, peptides, oligopeptides, or combinations thereof). In some embodiments, the meat analogue product is a vegan product that does not contain any ingredients from animal sources. In some embodiments, an enhanced meat product which contains animal protein (e.g., a beef, poultry, pork, fish, seafood, or egg product, in which a portion of the product is a protein product ingredient produced by microorganisms as described herein (e.g., one or more of single cell protein, cell lysate, protein isolate, protein extract, protein hydrolysate, free amino acids, peptides, oligopeptides, or combinations thereof)), is provided. For example, the protein product may be included as an extender in an enhanced meat product or in a meat analogue product, e.g., the protein product replaces at least about 10%, 20%, 30%, 40%, 50%, 60%, or 70% of the meat ingredient or an artificial or imitation meat ingredient (for example, a plant-based artificial or imitation meat analogue ingredient) to produce the enhanced meat product or meat analogue/imitation meat product, respectively. In some embodiments, the microorganisms are $CO_2$-grown or air-grown microorganisms, e.g., oxyhydrogen microorganisms. Nonlimiting examples of meat analogue products are provided in U.S. Pat. Nos. 10,327,464, 10,314,325, 10,287,568, 10,273,492, 10,172,380, 10,172,381, 10,093,913, 10,087, 434, 10,039,306, 9,943,096, 9,938,327, 9,833,768, 9,826, 772, 9,808,029, 9,737,875, 9,700,067, and 9,011,949, which are incorporated by reference herein in their entireties.

In some embodiments, at least a portion or all of the protein product in a structured food product described herein, including but not limited to, a meat analogue product, includes protein product (e.g., one or more of single cell protein, cell lysate, protein isolate, protein extract, protein hydrolysate, free amino acids, peptides, oligopeptides, or combinations thereof) derived from a *Cupriavidus* microorganism, such as, but not limited to, *Cupriavidus necator*, e.g., DSM 531 or DSM 541.

In some embodiments, at least a portion or all of the protein product in a food product described herein, including but not limited to, a meat analogue product, includes protein product (e.g., one or more of single cell protein, cell lysate, protein isolate, protein extract, protein hydrolysate, free amino acids, peptides, oligopeptides, or combinations thereof) derived from a lactic acid bacterium, such as, but not limited to a *Lactococcus, Lactobacillus, Enterococcus, Streptococcus*, or *Pediococcus* bacterium. In some embodiments, the lactic acid bacterium is a GRAS bacterium.

In some embodiments, at least a portion or all of the protein product in a food product described herein, including but not limited to, a meat analogue product, includes protein product (e.g., one or more of single cell protein, cell lysate, protein isolate, protein extract, protein hydrolysate, free amino acids, peptides, oligopeptides, or combinations thereof) derived from a *Fusarium* or *Rhizopus* fungal microorganism, such as but not limited to, *Fusarium venenatum, Rhizopus oligosporus*, or *Rhizopus oryzae*. In some embodiments, the fungal microorganism is a GRAS microorganism.

Use of chemoautotrophic microorganisms for production of protein and other biomolecules is described in PCT Application Nos. WO2017/165244 and WO2018/144965, both of which are incorporated herein by reference in their entireties.

Use of chemoautotrophic microorganisms for production of proteins and other components of food products is described in PCT Application Nos. PCT/US20/67555, filed Dec. 30, 2020, PCT/US21/14795, filed Jan. 22, 2021, and PCT/US21/23949, filed Mar. 24, 2021, all of which are incorporated herein by reference in their entireties.

Meat Analogue Products

Meat analogue products are provided that resemble animal meat. The meat analogue product contains protein product (e.g., one or more of single cell protein, cell lysate, protein isolate, protein extract, protein hydrolysate, free amino acids, peptides, oligopeptides, or combinations thereof), derived from one or more microorganism as described herein, and simulates texture and/or physical characteristics of animal meat, such as, for example, flavor, aroma, texture, appearance, etc.

In some embodiments, a meat analogue product includes at least about 10%, about 15%, about 20%, about 25%, about 30%, about 35%, about 40%, about 45%, about 50%, about 55%, about 60%, about 65%, or about 70% by weight of microbial protein product as described herein, optionally bound together by one or more binding agents, to produce a food product that has one or more similar textural and/or functional characteristics in comparison to animal meat. In some embodiments, the meat analogue product resembles animal meat, for example, ground animal meat (e.g., ground beef, ground pork, ground turkey). In some embodiments, the meat analogue product is principally, substantially, or entirely composed of ingredients derived from non-animal sources. In alternative embodiments, the meat analogue product is composed of ingredients partially derived from animal sources but supplemented with ingredients derived from non-animal sources. In some embodiments, the meat analogue product further includes one or more agent release systems and/or other ingredients. In various embodiments, meat analogue products herein may be sliced, cut, ground, shredded, grated, or otherwise processed, or left unprocessed. Examples of sliced forms include but are not limited to dried meats, cured meats, and sliced lunch meats. In some embodiments, the meat analogue food products provided herein are shredded and then bound together, chunked and formed, ground and formed, or chopped and formed according, for example, to produce a product similar in appearance and texture to animal jerky.

In some embodiments, the meat analogue products are vegan. In some embodiments, the meat analogue products comprise no GMO ingredients. In some embodiments, the meat analogue products comprise no ingredients derived from nuts. In some embodiments, the meat analogue products comprise less than about 0.6% or less than about 0.5% by weight of sodium. In some embodiments, the meat-like food products comprise no gluten. In some embodiments, the meat-like food products comprise no soy.

In some embodiments, the meat analogue food products provided herein comprise about 5% to about 30% by weight of lipid. In some embodiments, the meat analogue products comprise about 0.5% to about 10% by weight of total carbohydrate. In some embodiments, the meat analogue products comprise about 0.5% to about 5% by weight of edible fiber.

The meat analogue products provided herein comprise a moisture content (MC) of at least about 30%, 40%, 50%, 60%, 70%, 80%, or 90% by weight. In some embodiments, the meat analogue products comprise a similar MC as animal meat.

In some embodiments, the meat analogue products comprise one or more coloring agents. In some embodiments, the meat analogue products comprise one or more color enhancers. In some embodiments, the meat-like food products comprise mixtures of two or more coloring agents, color stabilizers, and/or color enhancers. Non-limiting examples of such mixtures include beet extract and annatto, beet extract and turmeric, beet extract and saffron, beet extract and purple carrot, beet extract and grape seed extract, beet extract and tomato extract, beet extract and lycopene, beet extract and beta carotene, beet extract and anthocyanin, beet extract and anthocyanin and annatto, beet extract and annatto and lycopene, beet extract and ascorbic acid, anthocyanin and annatto, beet extract and annatto and ascorbic acid, beet extract and annatto and beta carotene, beet extract and turmeric and ascorbic acid, and anthocyanin and lycopene and annatto. In some such embodiments, the coloring agents, color stabilizers, and/or color enhancers are present at equal weight ratios. In other such embodiments, the coloring agents, color stabilizers, and/or color enhancers are present at unequal weight ratios (e.g., 55:45, 60:40, 65:35, 2:1, 70:30, 75:25, 80:20, 5:1, 85:15, 90:10, 20:1, 95:5, 99:1). In some embodiments, the meat analogue products comprise browning agents, such as, but not limited to, pentose (e.g., ribose, arabinose, xylose), hexose (e.g., glucose, fructose, mannose, galactose), dextrins, and commercial browning agents (e.g., red arrow dextrose, wood-derived agents).

In some embodiments, a meat analogue product herein includes one or more plant protein source such as, but not limited to, pea, rice, glutinous rice, wheat, gluten, soy, hemp, canola, insects, algae, and/or buckwheat, in combination with a protein product produced by microorganisms as described herein, wherein the protein product imparts a meat-like flavor to the composition.

In some embodiments, a meat analogue product herein includes a heme compound, such as a heme-containing polypeptide. For example, the heme compound (e.g., heme-containing polypeptide) may be from the microorganism from which the protein product is derived.

Dough Compositions

Dough compositions for production of a structured food product, e.g., structured meat analogue product, as described herein are provided. The composition of the dough mixture includes one or more protein product (e.g., single cell protein, cell lysate, protein isolate, protein extract, protein hydrolysate, free amino acids, peptides, and/or oligopeptides) derived from one or more microorganism as described herein, and may include, for example, binders, salts, texturing agents, etc. The mixture may also be supplemented with one or more flavorant and/or flavor enhancer, such as, for example, a flavohemoglobin, one or more vitamin, and/or one or more nutritional additive, as described herein, supra. Nonlimiting examples of dough compositions are described, for example, in U.S. Pat. No. 9,526,267, which is incorporated by reference herein in its entirety.

In some embodiments, the dough composition includes a protein hydrolysate wherein the average molecular weight of proteins in the hydrolysate is about 5 kD to about 10 kD, or any of about 5 kD, 6 kD, 7 kD, 8 kD, 9 kD, or 10 kD, or any of about 5 kD to about 7 kD, about 6 kD to about 8 kD, about 7 kD to about 9 kD, 8 kD to about 10 kD, about 5 kD to about 8 kD or about 7 kD to about 10 kD.

In some embodiments, the protein product in the dough composition is produced under conditions in which globular undenatured protein is retained. For example, such conditions may include mild cell lysis followed by separation of soluble components (e.g., proteins) from insoluble components (e.g., cell debris).

In some embodiments, the dough includes protein from one or more additional source, in addition to the microbial protein product as described herein. Nonlimiting examples of sources for additional protein include plant sources (e.g., wheat gluten, soy, pea, wheat), algae, other non-animal proteins, or milk.

In some embodiments, the dough includes water content of any of about 40% (w/w), about 45% (w/w), about 50% (w/w), about 55% (w/w), about 60% (w/w), about 65% (w/w), about 70% (w/w), about 75% (w/w), about 80% (w/w), about 40% (w/w) to about 80% (w/w), about 40% (w/w) to about 50% (w/w), about 45% (w/w) to about 55% (w/w), about 50% (w/w) to about 60% (w/w), about 55% (w/w) to about 65% (w/w), about 60% (w/w) to about 70% (w/w), about 65% (w/w) to about 75% (w/w), about 70% (w/w) to about 80% (w/w), about 40% (w/w) to about 60% (w/w), about 50% (w/w) to about 70% (w/w), or about 60% (w/w) to about 80% (w/w).

In some embodiments, the shear strength of the dough composition is greater than about 1000 psig.

In some embodiments, the dough is an emulsion, for example, an emulsion of one or more protein product as described herein and one or more oil.

Texturized Microbial and Plant Protein

Texturized compositions that contain both microbial protein product as described herein and plant protein, or microbial protein as the sole or main protein source are provided. In some embodiments, the texturized composition is in the form of a high moisture meat analogue product. In other embodiments, the texturized composition is in the form of a dry textured protein that may be formulated into a meat analog by various hydration techniques.

In some embodiments, a combination of microbial protein product (e.g., single cell protein, cell lysate, protein isolate, protein extract, protein hydrolysate, free amino acids, peptides, and/or oligopeptides) and plant protein (e.g., soy, pea, mung, fava bean, and/or cashew) and/or insect protein, and optionally flavor agents and/or seasonings, contains at least about 5%, 10%, 15%, 20%, 25%, or 30%, 40%, or 50% protein product by weight, or any of about 5% to about 30%, about 5% to about 10%, about 5% to about 20%, about 5% to about 25%, about 10% to about 20%, about 10% to about 30%, about 15% to about 30%, about 20% to about 30% by weight, about 30% to about 40% by weight, or about 40% to about 50% by weight. In some embodiments, additional linking agents, such as calcium salts and/or magnesium salts may be added. In some embodiments, the pH of the slurry may be adjusted to be acidic pH 4 to pH 7. In other embodiments, the pH of the slurry may be adjusted to an alkaline pH.

The mixture may be extruded to form a texturized product, such as a meat analogue that resembles a crumbled meat product, like crumbled beef, or a shredded meat product, such as pulled pork. The mixture may be extruded to form a high moisture meat analog.

In some embodiments, the textured product may be shaped in the form of balls. In other embodiments, the textured products may form chunks or shreds. The textured protein may be formed into sausages. The textured product may be mixed with other nutritive or non-nutritive gels, such as konjac, to produce fibrated structures with ions such as Ca(OH)$_2$.

Microbial proteins can be mixed with plant derived proteins or protein flours from sources such as but not limited to rice, oat, barley, tapioca, amaranth, *quinoa*, sorghum, soy, wheat, and corn. To create fibers, edible fibers can be used in texturization, such as but are not limited to, *psyllium* husk, inulin, barley bran, carrot fiber, citrus fiber, corn bran, pea fiber, rice bran, head husks, soy fiber, soy polysaccharide, and/or wheat bran. For extrusion, the mixture may be processed, from start to finish, in an extruder (e.g., twin screw extruder), equipped with a gravimetric feeder, and rod die and cutting device (crumbled product) or texturizing die and circulator (shredded high moisture meat analog product). Other shear creation techniques which may be used include high moisture extrusion cooking. In some embodiments, unit operations such mixing, wet extrusion, cutting, or shredding may be used. In other embodiments, forming and cryofreezing may be added. In some embodiments, thermoform packaging may be used.

Methods of Making Structured Food Compositions

Methods of making a structured food composition, such as a structured meat analogue composition, are described herein. A protein product (e.g., single cell protein, cell lysate, protein isolate, protein extract, protein hydrolysate, free amino acids, peptides, and/or oligopeptides), derived from a microorganism, is processed into the structured food composition. One nonlimiting embodiment of a workflow for producing a structured food product is shown in FIG. 1.

A physical process of shearing, mixing, and/or spinning may be used to create deformation and fiber alignment from the protein product, such as a protein hydrolysate product. The creation of fibers requires a material phase separation followed by an internal structure alignment followed by solidification. The type of fiber alignment and the properties of the resultant structured material depend upon the material composition and rheological properties of a preconditioned dough, water-holding capacity, and other factors imparting structure and food functionality, including water absorption, water solubility, oil absorption indexes, expansion index, bulk density and viscosity.

A dough composition, as described herein, supra, may be converted to a structured food composition. Thermochemical processing, e.g., extrusion, may be deployed as a method to structure the protein. For example, extrusion may include: (i) preconditioning of the material outside the extruder; (ii) mixing/cooking inside the extruder barrel; and (iii) cooling in the die. Physical factors affecting structure formation by extrusion include, for example, temperature, screw speed, and extruder design. Factors imparting structure and food functionality include water absorption, water solubility, oil absorption index, expansion index, bulk density and viscosity of the dough. In some embodiments, extrusion of a dough composition as described herein produces aligned fibers, i.e., protein fiber networks and/or aligned protein fibers that produce a structured food product such as a product with a meat-like texture. For example, the dough composition is processed in a temperature controlled extruder designed to place mechanical shear in a cone-in-cone geometry on the isotropically mixed dough composition to form a macroscopic, anisotropic mixture with substantially aligned fibrous structure. Nonlimiting examples of this are described, for example, in U.S. Pat. No. 9,526,267, which is incorporated by reference herein in its entirety.

High moisture extrusion may result in denaturation of proteins and the formation of cross-links, which reduce the solubility of extruded material. In some embodiments, the conditions of extrusion may cause a rupturing of previously denatured protein molecules into subunits. The subunits may subsequently reaggregate into a product exhibiting the characteristic texture and microstructure of texturized protein. This reaggregation may be produced mainly by intermolecular peptide bonds, although to a lesser extent, hydrophobic interactions plus hydrogen and disulfide bonds may play a role as well.

In some embodiments, a spinning process is deployed for processing the microbial protein product into a structured food composition. For example, a solution containing the protein product may be extruded through a spinneret, and subsequently immersed into a bath containing a nonsolvent for the protein product. Exchange of solvent and non-solvent may result in precipitation and solidification of the extruded protein phase forming stretched filaments (e.g., filaments with a thickness of about 20 mm). (Dekkers, et al. (2018) *Trends Food Sci Technol* 81:25-36)

In some embodiments, conversion of protein product into a structured food product includes formation of a structured hydrocolloid. A structured hydrocolloid may be formed from a mixture of microbial derived protein product as described herein, for example, a protein hydrolysate, and a hydrocolloid, which precipitates with metal cations, e.g., at an elevated temperature, forming a fibrous product. Nonlimiting examples of hydrocolloids include pectins, for example, in the form of alginates or gums.

Solidification of a structured food composition, produced by a method as described herein may include heating, cooling, drying, and/or coagulation.

Protein Hydrolysates

In some embodiments, at least a portion or all of the protein product is produced by hydrolyzing protein (e.g., single cell protein, cell lysate, protein isolate, and/or protein extract) from at least one microorganism described herein. For example, hydrolysis of cellular protein may produce peptides, oligopeptides, and/or free amino acids.

Hydrolysis of microbial protein may be performed by acidic, basic, and/or enzymatic processes. Methods for hydrolyzing protein are well known in the art. Nonlimiting examples of microbial protein hydrolysis methods and hydrolysate compositions may be found in U.S. Provisional Application Nos. 62/901,169 and 62/943,754, and PCT Application No. US20/50902, which are incorporated herein by reference in their entireties.

In some embodiments, a hydrolysis method may include raising or lowering the pH of a proteinaceous suspension, e.g., a suspension of microbial biomass, thereby producing an alkaline or acidic suspension, respectively. The starting biomass suspension may include a suitable amount of the biomass in liquid, for example, microbial biomass in a growth medium. In some embodiments, the amount of the biomass, dried weight/reaction volume, is at least about 0.01%, at least about 0.2%, at least about 0.5%, at least about 1%, at least about 2%, or at least about 3%, or about 0.1% to about 8%, e.g., about 0.2% to about 8%, about 0.5% to about 6%, about 1% to about 6%, about 2% to about 6%, including about 3% to about 5%.

In some embodiments, cells within the biomass are subjected to lysis at the beginning of the process, e.g., prior to raising or lowering the pH, to facilitate harvesting the protein from the biomass into a suspension composition.

In certain embodiments, the alkaline or acidic suspension may be subjected to heat for a suitable amount of time, to generate a protein hydrolysate composition. The suspension may be concentrated, dried (e.g., lyophilized), or utilized directly as a liquid suspension. In certain embodiments, the alkaline or acidic suspension is subjected to heat and elevated pressure, e.g., by autoclaving the alkaline or acidic suspension, to generate a protein hydrolysate composition. In some embodiments, the suspension is neutralized with buffer to lower or raise the pH after the heat or heat/pressure treatment. In certain embodiments, the pH is lowered (for an alkaline suspension) or raised (for an acidic suspension) sufficiently to allow subsequent enzymatic treatment of the suspension with a hydrolytic enzyme, such as a protease (e.g., alkaline protease, acid protease, or metalloprotease). After enzymatic hydrolysis, a protein hydrolysate composition is produced. In other embodiments, the biomass suspension is hydrolyzed with a proteolytic enzyme, such as a protease (e.g., alkaline protease, acid protease, or metalloprotease), without prior alkaline or acid treatment.

In certain embodiments, the hydrolyzed protein in the protein hydrolysate is predominantly in the soluble fraction of the suspension. The resulting suspension may be clarified, e.g., by centrifuge, to obtain a supernatant fraction, which contains hydrolyzed protein. In some embodiments, the hydrolytic treatment (e.g., alkaline or acid hydrolysis, optionally including enzymatic (e.g., protease) treatment or enzymatic hydrolysis alone) is followed by clarification of the suspension (hydrolysate) to remove undissolved material in the suspension, e.g., separation of soluble and insoluble fractions. The suspension may be clarified using any suitable method, such as centrifugation, filtration, etc. In some embodiments, after the suspension is clarified, e.g., centrifuged, the supernatant may be separated from the pellet.

In some embodiments, the clarified liquid composition (e.g., soluble fraction, such as supernatant of separated suspension), which contains hydrolyzed protein, is dried, e.g., lyophilized to produce a dry or substantially dry composition. In some embodiments, the lyophilized composition has a water content of about 10% or less, e.g., about 8% or less, about 6% or less, about 5% or less, including about 3% or less. In some embodiments, the lyophilized protein hydrolysate composition has a water content from about 1% to about 10%, e.g., about 1% to about 8%, about 1% to about 6%, including about 2% to about 5%.

In some embodiments, the clarified liquid composition (e.g., soluble fraction, such as supernatant of separated suspension) is dewatered or concentrated to lower the water content. In some embodiments, the concentrated composition has a water content of about 80% or less, e.g., about 75% or less, about 50% or less, about 40% or less, including about 30% or less; and in some embodiments, each of the foregoing water content ranges may be at least about 20%, at least about 25%, at least about 30%, at least about 40%, or at least about 50% (to the extent such foregoing ranges exceed such lower limits). In some embodiments, the dewatered product is dried, e.g., using heat and/or evaporation, employing a method such as, but not limited to, one or more of spray drying; drum drying; oven drying; vacuum drying; vacuum oven drying; drying under an inert gas such as $N_2$; and solar evaporation. In some embodiments, the clarified product is dewatered initially with a rotary evaporator, e.g., such that about 50% to about 65% of the moisture is removed. In some embodiments, further dewatering is achieved by lyophilization, e.g., such that the lyophilized protein hydrolysate composition has a water content from about 1% to about 10%, e.g., about 1% to about 8%, about 1% to about 6%, including about 2% to about 5%.

In some embodiments, at least a portion or all of the protein from which a protein hydrolysate is produced (e.g., single cell protein, cell lysate, protein isolate, and/or protein extract) is from a *Cupriavidus* microorganism, such as, but not limited to, *Cupriavidus necator*, e.g., DSM 531 or DSM 541. In some embodiments, a protein hydrolysate composition (e.g., containing peptides, oligopeptides, and/or free amino acids) is derived from protein from a *Cupriavidus* microorganism, such as, but not limited to, *Cupriavidus necator*, e.g., DSM 531 or DSM 541.

In some embodiments, at least a portion or all of the protein from which a protein hydrolysate is produced (e.g., single cell protein, cell lysate, protein isolate, and/or protein extract) is from a lactic acid bacterium, such as, but not limited to a *Lactococcus, Lactobacillus, Enterococcus, Streptococcus*, or *Pediococcus* bacterium. In some embodiments, a protein hydrolysate composition (e.g., containing peptides, oligopeptides, and/or free amino acids) is derived from protein from a lactic acid bacterium, such as, but not limited to, a *Lactococcus, Lactobacillus, Enterococcus, Streptococcus*, or *Pediococcus* bacterium. In some embodiments, the lactic acid bacterium is a GRAS bacterium.

In some embodiments, at least a portion or all of the protein from which a protein hydrolysate is produced (e.g., single cell protein, cell lysate, protein isolate, and/or protein extract) is from a *Fusarium* or *Rhizopus* fungal microorganism, such as but not limited to, *Fusarium venenatum, Rhizopus oligosporus*, or *Rhizopus oryzae*. In some embodiments, a protein hydrolysate composition (e.g., containing peptides, oligopeptides, and/or free amino acids) is derived from protein from a *Fusarium* or *Rhizopus* fungal microorganism, such as but not limited to, *Fusarium venenatum, Rhizopus oligosporus*, or *Rhizopus oryzae*.

In some embodiments, protein hydrolysates herein include peptides that comprise or consist of peptides that are of a size range that is typically non-allergenic, e.g., non-allergenic to humans. In some embodiments, protein hydrolysates that are incorporated into food compositions as described herein include peptides and free amino acids, wherein the peptides are of a size range that is typically non-allergenic. In some embodiments, non-allergenic peptides are of a size range that is about 800 to about 1500 Da average molecular weight distribution. For example, peptides obtained by protein hydrolysis as described herein may be less than any of about 1500, 1400, 1300, 1200, 1100, 1000, 900, or 800 Da average molecular weight.

In some embodiments, salts are removed from protein hydrolysates (for example, where acid or alkaline salts are used for hydrolysis), prior to incorporation of the hydrolysate into a food composition as described herein. For example, the protein hydrolysate may be purified by filtration (e.g., ultrafiltration) or dialysis to remove salts and/or other impurities.

Microorganisms

Proteinaceous material (protein product) used in the methods and incorporated into the compositions described herein is derived from one or more microorganism. The microbial organisms from which single cell protein, cell lysate, protein isolate, protein hydrolysate, free amino acids, peptides, oligopeptides, or combinations thereof is derived may be photoautotrophic, heterotrophic, methanotrophic, methylotrophic, carboxydotrophic or chemoautotrophic organisms. In some embodiments, the microbial organisms include oxyhydrogen microorganism. The microbial organisms may be wild-type, or may be genetically modified (e.g., recombinant), or a combination thereof.

Microbial biomass may be collected from a culture of one or more suitable microorganism, e.g., in a fermenter or bioreactor. Biomass may be collected using any suitable method, such as a centrifuge, to separate the cell mass from the culture medium. In some embodiments, the collected biomass may be used to produce a protein hydrolysate composition. In some embodiments, the collected biomass is spray dried or lyophilized to generate a dry biomass, which then may be used as an ingredient for production of a food composition as described herein or to produce a protein hydrolysate composition. In some embodiments, a protein product (e.g., single cell protein, cell lysate, protein extract, protein-containing extract, protein isolate, protein hydrolysate, free amino acids, peptides, oligopeptides, or combinations thereof) is produced from the collected biomass.

In some embodiments, the microorganisms or protein product thereof includes a strain within the genus *Cupriavidus* or *Ralstonia* or *Hydrogenobacter*. In some embodiments, the microorganisms include the species *Cupriavidus necator* or *Cupriavidus metallidurans*. In some embodiments, the microorganisms include a strain of the species *Cupriavidus necator* DSM 531 or DSM 541. In some embodiments, the microorganisms includes the species *Cupriavidus metallidurans*. In some embodiments, the microorganisms include a strain of the species *Cupriavidus metallidurans* DSM 2839.

In some embodiments, the microorganisms or protein product thereof includes a strain within the genus *Xanthobacter*. In some embodiments, the microorganisms includes the species *Xanthobacter autotrophicus*. In some embodiments, the microorganisms include a strain of the species *Xanthobacter autotrophicus* DSM 432.

In some embodiments, the microorganisms or protein product thereof includes a *Rhodococcus* or *Gordonia* microorganism. In some embodiments, the microorganisms include *Rhodococcus opacus*. In some embodiments, the microorganisms include *Rhodococcus opacus* (DSM 43205) or *Rhodococcus* sp. (DSM 3346). In some embodiments, the microorganisms include *Rhodococcus opacus; Hydrogenovibrio marinus; Rhodopseudomonas capsulata; Hydrogeno-*

*bacter thermophilus*; or *Rhodobacter sphaeroides*. In some embodiments, the microorganisms include a strain within the family burkholderiaceae.

In some embodiments, the microorganisms or protein product thereof includes a lactic acid bacterium, such as, but not limited to a *Lactococcus, Lactobacillus, Enterococcus, Streptococcus*, or *Pediococcus* bacterium. In some embodiments, the lactic acid bacterium is a GRAS bacterium.

In some embodiments, the microorganisms or protein product thereof includes a *Fusarium* or *Rhizopus* fungal microorganism, such as but not limited to, *Fusarium venenatum, Rhizopus oligosporus*, or *Rhizopus oryzae*. In some embodiments, the fungal microorganism is a GRAS microorganism.

In some embodiments, a consortium of microorganisms (i.e., two or more microorganisms grown together) is used as a source of protein product in the methods and compositions described herein. The consortium may include one or more of any of the microorganism species or strains described herein or one or more microorganisms having one or more microorganism traits described herein. In some embodiments, the consortium includes two or more of any of the microorganism species or strains or microorganisms described herein or two or more microorganisms having one or more microorganism traits described herein.

In some embodiments, a microorganism as described herein can accumulate protein to about 50% or more of the total cell mass by weight. In some embodiments, a microorganism as described herein can accumulate protein to about 60% or more of the total cell mass by weight. In some embodiments, the microorganism can accumulate protein to about 70% or more of the total cell mass by weight. In some embodiments, the microorganism can accumulate protein to about 80% or more of the total cell mass by weight. In some non-limiting embodiments, the microorganism exhibiting these traits is *Cupriavidus necator*, e.g., *Cupriavidus necator* DSM 531 or DSM 541.

In some embodiments, a microorganism as described herein can naturally grow on $H_2/CO_2$ and/or syngas and/or producer gas. In some embodiments, the microorganism can naturally accumulate polyhydroxyalkanoate (PHA) (e.g., polyhydroxybutyrate (PHB)) to about 50% or more of the cell biomass by weight. In some embodiments, the microorganism has a native ability to direct a high flux of carbon through the acetyl-CoA metabolic intermediate, which can lead into fatty acid biosynthesis, along with a number of other synthetic pathways, for example, PHA, e.g., PHB, synthesis, and/or amino acid biosynthesis. In some embodiments, the microorganism exhibiting these traits is *Cupriavidus necator*, e.g., *Cupriavidus necator* DSM 531 or DSM 541). In some embodiments, the microorganism does not produce and/or accumulate PHA (e.g., PHB).

In some nonlimiting embodiments, the microorganisms or protein product thereof includes *Corynebacterium autotrophicum*. In some nonlimiting embodiments, the microorganisms include *Corynebacterium autotrophicum* and/or *Corynebacterium glutamicum*. In some embodiments, the microorganisms include *Hydrogenovibrio marinus*. In some embodiments, the microorganisms include *Rhodopseudomonas* capsulate, *Rhodopseudomonas palustris*, or *Rhodobacter sphaeroides*.

In some embodiments, the microorganisms or protein product thereof includes one or more of the following genera: *Cupriavidus, Rhodococcus, Hydrogenovibrio., Rhodopseudomonas, Hydrogenobacter, Gordonia, Arthrobacter, Streptomycetes, Rhodobacter*, and/or *Xanthobacter*.

In some embodiments, the microorganisms or protein product thereof includes a microorganism of the class Actinobacteria. In some embodiments, the microorganisms include a microorganism of the suborder corynebacterineae (*corynebacterium*, gordoniaceae, mycobacteriaceae and nocardiaceae). In some embodiments, the microorganisms include a microorganism of the family of Nocardiaceae. In some embodiments, the microorganisms include a microorganism drawn from one or more of the following classifications: *Corynebacterium, Gordonia, Rhodococcus, Mycobacterium* and *Tsukamurella*. In some embodiments, the microorganisms include a microorganism of the genus *Rhodococcus*, such as *Rhodococcus opacus, Rhodococcus aurantiacus; Rhodococcus baikonurensis; Rhodococcus boritolerans; Rhodococcus equi; Rhodococcus coprophilus; Rhodococcus corynebacterioides; Nocardia corynebacterioides* (synonym: *Nocardia corynebacterioides*); *Rhodococcus erythropolis; Rhodococcus fascians; Rhodococcus globerulus; Rhodococcus gordoniae; Rhodococcus jostii; Rhodococcus koreensis; Rhodococcus kroppenstedtii; Rhodococcus maanshanensis; Rhodococcus marinonascens; Rhodococcus opacus; Rhodococcus percolatus; Rhodococcus phenolicus; Rhodococcus polyvorum; Rhodococcus pyridinivorans; Rhodococcus rhodochrous; Rhodococcus rhodnfi;* (synonym: *Nocardia* rhodnfi); *Rhodococcus ruber* (synonym: Streptothrix *rubra*); *Rhodococcus* sp. RHA1; *Rhodococcus triatomae; Rhodococcus tukisamuensis; Rhodococcus wratislaviensis* (synonym: *Tsukamurella wratislaviensis*); *Rhodococcus yunnanensis*; or *Rhodococcus zopfii*. In some embodiments, the microorganisms include *Rhodococcus opacus* strain DSM 43205 or DSM 43206. In some embodiments, the microorganisms include strain *Rhodococcus* sp. DSM 3346.

In some embodiments, the microorganisms or protein product thereof includes a microorganism (e.g., a microorganism of any of the microorganism genera or species described herein) that can naturally grow on $H_2$/$CO_2$ and/or syngas and/or producer gas, and that can naturally accumulate lipid to at least about 10%, 20%, 30%, 40%, 50%, 60%, 70%, 80%, or more of the cell biomass by weight. In some embodiments, the microorganisms include a microorganism (e.g., a microorganism of any of the microorganism genera or species described herein) that has a native ability to send a high flux of carbon down the fatty acid biosynthesis pathway. In some embodiments, the microorganism exhibiting these traits is *Rhodococcus opacus* (e.g., *Rhodococcus opacus* DSM 43205 or DSM 43206 or DSM 44193) or *Cupriavidus necator* (e.g., *Cupriavidus necator* DSM 531 or DSM 541).

In some embodiments, the microorganisms or protein product thereof include an oxyhydrogen or knallgas strain. In some embodiments, the microorganisms include one or more of the following knallgas microorganisms: *Aquifex pyrophilus, Aquifex aeolicus*, or other *Aquifex* sp.; *Cupriavidus necator* or *Cupriavidus metallidurans* or other *Cupriavidus* sp.; *Corynebacterium autotrophicum* or other *Corynebacterium* sp.; *Gordonia desulfuricans, Gordonia polyisoprenivorans, Gordonia rubripertincta, Gordonia hydrophobica, Gordonia westfalica*, or other *Gordonia* sp.; *Nocardia autotrophica, Nocardia opaca*, or other *Nocardia* sp.; purple non-sulfur photosynthetic bacteria, including but not limited to, *Rhodobacter sphaeroides, Rhodopseudomonas palustris, Rhodopseudomonas capsulata, Rhodopseudomonas viridis, Rhodopseudomonas sulfoviridis, Rhodopseudomonas blastica, Rhodopseudomonas spheroides, Rhodopseudomonas acidophila*, or other *Rhodopseudomonas* sp.; *Rhodobacter* sp., *Rhodospirillum*

*rubrum*, or other *Rhodospirillum* sp.; *Rhodococcus opacus* or other *Rhodococcus* sp.; *Rhizobium japonicum* or other *Rhizobium* sp.; *Thiocapsa roseopersicina* or other *Thiocapsa* sp.; *Pseudomonas facilis, Pseudomonas flava, Pseudomonas putida, Pseudomonas hydrogenovora, Pseudomonas hydrogenothermophila, Pseudomonas palleronii, Pseudomonas pseudoflava, Pseudomonas saccharophila, Pseudomonas* thermophile, or other *Pseudomonas* sp.; *Hydrogenomonas pantotropha, Hydrogenomonas eutropha, Hydrogenomonas facilis*, or other *Hydrogenomonas* sp.; *Hydrogenobacter* thermophiles, *Hydrogenobacter halophilus, Hydrogenobacter hydrogenophilus*, or other *Hydrogenobacter* sp.; *Hydrogenophilus islandicus* or other *Hydrogenophilus* sp.; *Hydrogenovibrio marinus* or other *Hydrogenovibrio* sp.; *Hydrogenothermus marinus* or other *Hydrogenothermus* sp.; *Helicobacter pylori* or other *Helicobacter* sp.; *Xanthobacter autotrophicus, Xanthobacter flavus*, or other *Xanthobacter* sp.; *Hydrogenophaga flava, Hydrogenophaga palleronii, Hydrogenophaga pseudoflava*, or other *Hydrogenophaga* sp.; *Bradyrhizobium japonicum* or other *Bradyrhizobium* sp.; *Ralstonia eutropha* or other *Ralstonia* sp.; *Alcaligenes eutrophus, Alcaligenes facilis, Alcaligenes hydrogenophilus, Alcaligenes latus, Alcaligenes paradoxus, Alcaligenes ruhlandii*, or other *Alcaligenes* sp.; *Amycolata* sp.; *Aquaspirillum autotrophicum* or other *Aquaspirillum* sp.; *Arthrobacter* strain 11/X, *Arthrobacter methylotrophus*, or other *Arthrobacter* sp.; *Azospirillum lipoferum* or other *Azospirillum* sp.; *Variovorax paradoxus* or other *Variovorax* sp.; *Acidovorax facilis*, or other *Acidovorax* sp.; *Bacillus schlegelii, Bacillus tusciae*, other *Bacillus* sp.; *Calderobacterium hydrogenophilum* or other *Calderobacterium* sp.; *Derxia gummosa* or other *Derxia* sp.; *Flavobacterium* autothermophilum or other *Flavobacterium* sp.; *Microcyclus aquaticus* or other *Microcyclus* sp.; *Mycobacterium gordoniae* or other *Mycobacterium* sp.; *Paracoccus denitrificans* or other *Paracoccus* sp.; *Persephonella marina, Persephonella guaymasensis*, or other *Persephonella* sp.; *Renobacter vacuolatum* or other *Renobacter* sp.; *Seliberia carboxydohydrogena* or other *Seliberia* sp., *Streptomycetes coelicoflavus, Streptomycetes griseus, Streptomycetes xanthochromogenes, Streptomycetes thermocarboxydus*, and other *Streptomycetes* sp.; *Thermocrinis ruber* or other *Thermocrinis* sp.; *Wautersia* sp.; cyanobacteria including but not limited to *Anabaena oscillarioides, Anabaena spiroides, Anabaena cylindrica*, or other *Anabaena* sp., and *Arthrospira platensis, Arthrospira maxima*, or other *Arthrospira* sp.; green algae including but not limited to *Scenedesmus* obliquus or other *Scenedesmus* sp., *Chlamydomonas reinhardii* or other *Chlamydomonas* sp., *Ankistrodesmus* sp., and *Rhaphidium polymorphium* or other *Rhaphidium* sp. In some embodiments, a consortium of microorganisms that includes an oxyhydrogen microorganism, such as any of the above oxyhydrogen microorganisms, is used for production of protein product as described herein.

In some embodiments, the microorganisms or protein product thereof includes one or more of the following genera: *Cupriavidus; Xanthobacter, Dietzia; Gordonia; Mycobacterium; Nocardia; Pseudonocardia; Arthrobacter, Alcanivorax; Rhodococcus; Streptomyces; Rhodopseudomonas; Rhodobacter*; and *Acinetobacter*, or a consortium of microorganisms that includes one or more of these microorganism genera.

In some embodiments, the microorganisms or protein product thereof includes one or more of the following: *Arthrobacter methylotrophus* DSM 14008; *Rhodococcus opacus* DSM 44304; *Rhodococcus opacus* DSM 44311; *Xanthobacter autotrophicus* DSM 431; *Rhodococcus opa-* cus DSM 44236; *Rhodococcus ruber* DSM 43338; *Rhodococcus opacus* DSM 44315; *Cupriavidus metallidurans* DSM 2839; *Cupriavidus necator* DSM 531; *Cupriavidus necator* DSM 541; *Rhodococcus aetherivorans* DSM 44752; *Gordonia desulfuricans* DSM 44462; *Gordonia polyisoprenivorans* DSM 44266; *Gordonia polyisoprenivorans* DSM 44439; *Gordonia rubripertincta* DSM 46039; *Rhodococcus percolatus* DSM 44240; *Rhodococcus opacus* DSM 43206; *Gordonia hydrophobica* DSM 44015; *Rhodococcus zopfii* DSM 44189; *Gordonia westfalica* DSM 44215, *Xanthobacter autotrophicus* DSM 1618; *Xanthobacter autotrophicus* DSM 2267; *Xanthobacter autotrophicus* DSM 3874; *Streptomycetes coelicoflavus* DSM 41471; *Streptomycetes griseus* DSM 40236; *Streptomycetes sp.* DSM 40434; *Streptomycetes xanthochromogenes* DSM 40111; *Streptomycetes thermocarboxydus* DSM 44293; *Rhodobacter sphaeroides* DSM 158. In some embodiments, the microorganisms or protein product thereof includes a consortium of microorganisms that includes one or more of these microorganism strains, or one or more of any of the microorganism genera or species disclosed herein.

A number of different microorganisms have been characterized that are capable of growing on carbon monoxide as an electron donor and/or carbon source (i.e., carboxydotrophic microorganisms). In some cases, carboxydotrophic microorganisms can also use $H_2$ as an electron donor and/or grow mixotrophically. In some cases, the carboxydotrophic microorganisms are facultative chemolithoautotrophs [Biology of the Prokaryotes, edited by J Lengeler, G. Drews, H. Schlegel, John Wiley & Sons, Jul. 10, 2009, which is incorporated herein by reference in its entirety]. In some embodiments, the microorganisms or protein product thereof includes one or more of the following carboxydotrophic microorganisms: *Acinetobacter* sp.; *Alcaligenes carboxydus* or other *Alcaligenes* sp.; *Arthrobacter* sp.; *Azomonas* sp.; *Azotobacter* sp.; *Bacillus schlegelii* or other *Bacillus* sp.; *Hydrogenophaga pseudoflava* or other *Hydrogenophaga* sp.; *Pseudomonas carboxydohydrogena*, *Pseudomonas carboxydovorans*, *Pseudomonas compransoris*, *Pseudomonas gazotropha*, *Pseudomonas thermocarboxydovorans*, or other *Pseudomonas* sp.; *Rhizobium japonicum* or other *Rhizobium* sp.; and *Streptomyces* G26, *Streptomyces thermoautotrophicus*, or other *Streptomyces* sp. In some embodiments, the microorganisms or protein product thereof includes a consortium of microorganisms that includes carboxydotrophic microorganisms, such as one or more of the above carboxydotrophic microorganisms. In certain embodiments, a carboxydotrophic microorganism that is capable of chemolithoautotrophy is used. In certain embodiments, a carboxydotrophic microorganism that is able to utilize $H_2$ as an electron donor in respiration and/or biosynthesis is used.

In some embodiments, the microorganisms or protein product thereof includes obligate and/or facultative chemoautotrophic microorganisms, such as one or more of the following: *Acetoanaerobium* sp.; *Acetobacterium* sp.; *Acetogenium* sp.; *Achromobacter* sp.; *Acidianus* sp.; *Acinetobacter* sp.; *Actinomadura* sp.; *Aeromonas* sp.; *Alcaligenes* sp.; *Alcaliqenes* sp.; *Aquaspirillum* sp.; *Arcobacter* sp.; *Aureobacterium* sp.; *Bacillus* sp.; *Beggiatoa* sp.; *Butyribacterium* sp.; *Carboxydothermus* sp.; *Clostridium* sp.; *Comamonas* sp.; *Cupriavidus* sp.; *Dehalobacter* sp.; *Dehalococcoide* sp.; *Dehalospirillum* sp.; *Desulfobacterium* sp.; *Desulfomonile* sp.; *Desulfotomaculum* sp.; *Desulfovibrio* sp.; *Desulfurosarcina* sp.; *Ectothiorhodospira* sp.; *Enterobacter* sp.; *Eubacterium* sp.; *Ferroplasma* sp.; *Halothiabacillus* sp.; *Hydrogenobacter* sp.; *Hydrogenomonas* sp.; *Lep-*

*tospirillum* sp.; *Metallosphaera* sp.; *Methanobacterium* sp.; *Methanobrevibacter* sp.; *Methanococcus* sp.; *Methanococcoides* sp.; *Methanogenium* sp.; *Methanolobus* sp.; *Methanomicrobium* sp.; *Methanoplanus* sp.; *Methanosarcina* sp.; *Methanospirillum* sp.; *Methanothermus* sp.; *Methanothrix* sp.; *Micrococcus* sp.; *Nitrobacter* sp.; *Nitrobacteraceae* sp., *Nitrococcus* sp., *Nitrosococcus* sp.; *Nitrospina* sp., *Nitrospira* sp., *Nitrosolobus* sp.; *Nitrosomonas* sp.; *Nitrosospira* sp.; *Nitrosovibrio* sp.; *Nitrospina* sp.; *Oleomonas* sp.; *Paracoccus* sp.; *Peptostreptococcus* sp.; *Planctomycetes* sp.; *Pseudomonas* sp.; *Ralstonia* sp.; *Rhodobacter* sp.; *Rhodococcus* sp.; *Rhodocyclus* sp.; *Rhodomicrobium* sp.; *Rhodopseudomonas* sp.; *Rhodospirillum* sp.; *Shewanella* sp.; *Siderococcus* sp.; *Streptomyces* sp.; *Sulfobacillus* sp.; *Sulfolobus* sp.; *Thermothrix* sp., *Thiobacillus* sp.; *Thiomicrospira* sp.; *Thioploca* sp.; *Thiosphaera* sp.; *Thiothrix* sp.; *Thiovulum* sp.; sulfur-oxidizers; hydrogen-oxidizers; iron-oxidizers; acetogens; and methanogens; consortiums of microorganisms that include chemoautotrophs; chemoautotrophs native to at least one of hydrothermal vents, geothermal vents, hot springs, cold seeps, underground aquifers, salt lakes, saline formations, and soils; and extremophiles selected from one or more of thermophiles, hyperthermophiles, acidophiles, halophiles, and psychrophiles. In some embodiments, the microorganisms, or protein product thereof includes a consortium of microorganisms that includes chemoautotrophic microorganisms, such as one or more of the above chemoautotrophic microorganisms.

In some embodiments, the microorganisms or protein product thereof include extremophiles that can withstand extremes in various environmental parameters, such as temperature, radiation, pressure, gravity, vacuum, desiccation, salinity, pH, oxygen tension, and/or chemicals. Such microorganisms include hyperthermophiles, such as *Pyrolobus fumarii*; thermophiles, such as Synechococcus lividis; mesophiles and psychrophiles, such as *Psychrobacter*, and/or extremely thermophilic sulfur-metabolizers such as *Thermoproteus* sp., *Pyrodictium* sp., *Sulfolobus* sp., and *Acidianus* sp.; radiation tolerant organisms such as *Deinococcus radiodurans*; pressure tolerant microorganisms including piezophiles or barophiles; desiccant tolerant and anhydrobiotic microorganisms including xerophiles, such as *Artemia salina*; microbes and fungi; salt tolerant microorganisms including halophiles, such as Halobacteriacea and *Dunaliella salina*; pH tolerant microorganisms including alkaliphiles, such as Natronobacterium, *Bacillus firmus* OF4, *Spirulina* spp., and acidophiles such as *Cyanidium caldarium* and *Ferroplasma* sp; gas tolerant microorganisms, e.g., tolerant to pure $CO_2$, including *Cyanidium caldarium*; and metal tolerant microorganisms (metalotolerants), such as *Ferroplasma acidarmanus* and *Ralstonia* sp.

In certain embodiments, the microorganisms, or protein product thereof, include a cell line selected from eukaryotic plants, algae, cyanobacteria, green-sulfur bacteria, green non-sulfur bacteria, purple sulfur bacteria, purple non-sulfur bacteria, extremophiles, yeast, fungi, proteobacteria, engineered organisms thereof, and synthetic organisms. In certain embodiments, *Spirulina* is utilized.

In certain embodiments, the microorganisms or protein product thereof includes green non-sulfur bacteria, which include but are not limited to the following genera: *Chloroflexus, Chloronema, Oscillochloris, Heliothrix, Herpetosiphon, Roseiflexus*, and *Thermomicrobium*.

In certain embodiments, the microorganisms or protein product thereof includes green sulfur bacteria, which include but are not limited to the following genera: *Chlorobium, Clathrochloris*, and *Prosthecochloris*.

In certain embodiments, the microorganisms or protein product thereof includes purple sulfur bacteria, which include but are not limited to the following genera: *Allochromatium, Chromatium, Halochromatium, Isochromatium, Marichromatium, Rhodovulum, Thermochromatium, Thiocapsa, Thiorhodococcus*, and *Thiocystis*.

In certain embodiments, the microorganisms or protein product thereof includes purple non-sulfur bacteria, which include but are not limited to the following genera: *Phaeospirillum, Rhodobaca, Rhodobacter, Rhodomicrobium, Rhodopila, Rhodopseudomonas, Rhodothalassium, Rhodospirillum, Rodovibrio*, and *Roseospira*.

In some embodiments, the microorganisms or protein product thereof include a methanotroph and/or a methylotroph. In some embodiments, the microorganism is in the genus *Methylococcus*. In some embodiments, the microorganism is *Methylococcus capsulatus*. In some embodiments, the microorganism is a methylotroph. In some embodiments, the microorganism is in the genus *Methylobacterium*. In some embodiments, the microorganisms include one or more of the following species: *Methylobacterium zatmanii; Methylobacterium extorquens; Methylobacterium chloromethanicum.*

In some embodiments, the microorganisms or protein product thereof a hydrogen-oxidizing chemoautotroph and/or a carboxydotroph and/or a methylotroph and/or a methanotroph.

In certain embodiments, the microorganisms or protein product thereof includes microorganisms that can grow heterotrophically, utilizing multi-carbon organic molecules as carbon sources, such as, but not limited to sugars, for example, but not limited to, glucose and/or fructose. In some embodiments, the microorganism is capable of growing on untreated crude glycerol and/or glucose and/or methanol and/or acetate as the sole electron donor(s) and carbon source(s). In some embodiments, the microorganism is able to grow mixotrophically, for example, mixotrophic growth on an organic carbon source and an inorganic energy source (e.g., inorganic electron donor).

In certain embodiments, the microorganisms or protein product thereof includes one or more of eukaryotic plants, algae, cyanobacteria, green-sulfur bacteria, green non-sulfur bacteria, purple sulfur bacteria, purple non-sulfur bacteria, extremophiles, archaea, yeast, fungi, proteobacteria, engineered organisms thereof, and synthetic organisms.

In some embodiments, the microorganisms comprise or consist of gram-positive bacteria. In other embodiments, the microorganisms comprise or consist of gram-negative bacteria.

In certain embodiments, the microorganisms or protein product thereof includes naturally occurring and/or non-genetically modified (non-GMO) microorganisms and/or non-pathogenic and/or are grown in specific environmental conditions provided by the bioprocesses that are absent from the natural surrounding environment.

In certain embodiments, the microorganisms or consortium of microorganisms are isolated from environmental samples and enriched with desirable microorganisms using methods known in the art of microbiology, for example, growth in the presence of targeted electron donors, including, but not limited to, one or more of: $H_2$, CO, syngas and/or methane, and/or electron acceptors including, but not limited to, one or more of $O_2$, nitrate, ferric iron, and/or $CO_2$, and/or environmental conditions (e.g., temperature, pH, pressure, dissolved oxygen (DO), salinity, the presence of various impurities and pollutants, etc.).

In certain embodiments, the microorganisms or consortium of microorganisms include probiotic microorganisms. In certain embodiments, the microorganisms or consortium of microorganisms include "generally recognized as safe" (GRAS) microorganisms, e.g., bacterial and/or fungal GRAS microorganisms. In certain embodiments, the microorganisms or consortium of microorganisms include yeast, such as, but not limited to, one or more of the following: *Candida humilis; Candida Debaryomyces hansenii; Kazachstania exigua* (*Saccharomyces* exiguous); *Saccharomyces cerevisiae; Saccharomyces florentinus; Torulaspora delbrueckii; Trichosporon beigelli*; and/or include fungi, such as, but not limited to, one or more of the following: *Aspergillus oryzae; Aspergillus sojae; Fusarium venenatum A3/5; Neurospora intermedia* var. *oncomensis; Rhizopus oligosporus; Rhizopus oryzae; Aspergillus luchuensis*; and/or include bacteria, such as, but not limited to, I one or more of the following: *Bacillus amyloliquefaciens; Bacillus subtilis; Bifidobacterium animalis* (*lactis*); *Bifidobacterium bifidum; Bifidobacterium breve; Bifidobacterium longum; Lactobacillus acidophilus; Lactobacillus brevis; Lactobacillus casei; Lactobacillus delbrueckii* subsp. *Bulgaricus; Lactobacillus fermentum; Lactobacillus helveticus; Lactobacillus kefiranofaciens; Lactobacillus lactis; Lactobacillus plantarum; Lactobacillus rhamnosus; Lactobacillus reuteri; Lactobacillus sakei; Lactobacillus sanfranciscensis; Lactococcus lactis* (*Streptococcus lactis, Streptococcus lactis* subsp. *Diacetylactis*); *Leuconostoc; Leuconostoc* carnosum; *Leuconostoc cremoris; Leuconostoc mesenteroides; Pediococcus; Propionibacterium freudenreichii; Arthrospira* (*Spirulina*) *platensis; Streptococcus faecalis; Streptococcus thermophilus.*

The protein containing biomass from which the protein product is derived may be produced by a consortium of different species of microorganisms. The consortium may optionally include multi-cellular organisms. In some embodiments, the consortium includes one or more of: an oxyhydrogen microorganism; a carboxydotroph; a methanotroph; a methylotroph; a chemoautotroph; a photoautotroph; and a heterotroph.

In some embodiments, the protein product also includes one or more vitamin produced the microorganisms from which the protein product was derived. In some non-limiting embodiments, the microorganisms include *Cupriavidus necator* (e.g., *Cupriavidus necator* DSM 531 or *Cupriavidus necator* DSM 541). In some non-limiting embodiments, the vitamin is a B vitamin, including but not limited to, vitamin B1, B2, and/or B12. In a non-limiting example, the B vitamin (e.g., B1, B2, and/or B12) may be produced by *Cupriavidus necator* (e.g., *Cupriavidus necator* DSM 531 or *Cupriavidus necator* DSM 541).

Microbial Cultures

Any suitable methods may be used to culture the microorganisms. The microorganism may be grown under any suitable conditions, in an environment that is suitable for growth and production of biomass. In some embodiments, the microorganism may be grown in autotrophic culture conditions, heterotrophic culture conditions, or a combination of autotrophic and heterotrophic culture conditions. A heterotrophic culture may include a suitable source of carbon and energy, such as one or more sugar (e.g., glucose, fructose, etc.). An autotrophic culture may include C1 chemicals such as carbon monoxide, carbon dioxide, methane, methanol, formate, and/or formic acid, and/or mixtures containing C1 chemicals, including, but not limited to various syngas compositions or various producer gas compositions, e.g., generated from low value sources of carbon and energy, such as, but not limited to, lignocellulosic energy crops, crop residues, bagasse, saw dust, forestry residue, or food, through the gasification, partial oxidation, pyrolysis, or steam reforming of said low value carbon sources, that can be used by an oxyhydrogen microorganism or hydrogen-oxidizing microorganism or carbon monoxide oxidizing microorganism as a carbon source and an energy source. Suitable ways of culturing the microorganisms and generating a biomass for use in the present methods are described, e.g., in PCT Application Nos. PCT/US2010/001402, PCT/US2011/034218, PCT/US2013/032362, PCT/US2014/029916, PCT/US2017/023110, PCT/US2018/016779, and U.S. Pat. No. 9,157,058, each of which is hereby incorporated by reference herein in its entirety. In some embodiments, the organism may be grown photosynthetically in a bioreactor, in a hydroponics system, in a greenhouse, or in a cultivated field, or may be collected from waste or natural sources.

The liquid cultures used to grow microorganism cells described herein can be housed in culture vessels known and used in the art. In some embodiments, large scale production in a bioreactor vessel can be used to produce large quantities of a desired molecule and/or biomass.

In certain embodiments, bioreactor vessels are used to contain, isolate, and/or protect the culture environment. The culture vessels include those that are known to those of ordinary skill in the art of large scale microbial culturing. Such culture vessels include but are not limited to one or more of the following: airlift reactors; biological scrubber columns; bubble columns; stirred tank reactors; continuous stirred tank reactors; counter-current, upflow, expanded-bed reactors; digesters and in particular digester systems, for example, such known in the art of bioremediation; filters including but not limited to trickling filters, rotating biological contactor filters, rotating discs, soil filters; fluidized bed reactors; gas lift fermenters; immobilized cell reactors; loop reactors; membrane biofilm reactors; pachuca tanks; packed-bed reactors; plug-flow reactors; static mixers; trickle bed reactors; and/or vertical shaft bioreactors.

Microbial culturing aimed at the commercial production of biomass and/or organic compounds, e.g., protein product as described herein, specifically single cell protein, cell lysate, protein extract, protein-containing extract, protein isolate, protein hydrolysate, free amino acids, peptides, oligopeptides, or combinations thereof, and/or other nutrients, such as, but not limited to vitamins (e.g., B vitamins, for example, B1, B2, and/or B12) may be performed in bioreactors at large scale (e.g., 500 L, 1,000 L 5,000 L, 10,000 L, 50,000 L, 100,000 L, 1,000,000 L bioreactor volumes and higher).

In certain embodiments, chemoautotrophic and/or heterotrophic and/or carboxydotrophic and/or methanotrophic and/or methylotrophic microorganisms are grown in a liquid media inside a bioreactor using methods described herein.

In some embodiments, the bioreactor containing the microorganisms is constructed of opaque materials that keep the culture in near or total darkness. Bioreactors constructed out of opaque materials such as steel and/or other metallic alloys and/or reinforced concrete and/or fiberglass and/or various high strength plastic materials can be designed to have large working volumes. In some embodiments, fermenters constructed of steel or other metallic alloys that are 50,000 liters and greater in volume are utilized. In some embodiments, bioreactors capable of containing positive headspace pressures above ambient pressure are utilized. In some embodiments, egg-shape or cylindrical digesters or vertical shaft bioreactors 3,000,000 liters and greater in volume are utilized. In some embodiments, the bioreactor comprising the microorganism does not allow light to penetrate part or most or all of its contained liquid volume. In certain non-limiting embodiments, the microorganism used in the $CO_2$-fixation step is not photosynthetic. In certain non-limiting embodiments, the bioreactor design does not confine the culture in thin layers or have transparent walls so as to have light available to all parts, as is generally necessary with photosynthesis. In some embodiments, the microorganism is cultured without significant or any exposure to light. In certain such embodiments, net $CO_2$ consumption still occurs in the absence of light due to chemoautotrophic metabolism and conditions. In certain embodiments, converting electricity to artificial light is not required in a biological system for $CO_2$ capture and conversion.

In certain embodiments, the lack of light dependence facilitates continuous $CO_2$ capture operations, day and night, year-round, in all weather conditions, without the need for any artificial lighting.

In some embodiments, the microorganisms are grown and maintained in a medium containing a gaseous carbon source, such as but not limited to syngas, producer gas, or $H_2$ and $CO_2$ gas mixtures, in the absence of light; where such growth is known as chemoautotrophic growth.

In some embodiments, syngas, for example, generated from gasification of organic matter is utilized by the microorganisms for chemoautotrophic growth. The organic matter may be, for example, from an agricultural source (e.g., corn stover, bagasse).

In some embodiments, food grade $CO_2$ and/or air that goes through a direct air capture unit is utilized by the microorganisms for chemoautotrophic growth. Non-limiting examples of direct air capture may be found in U.S. Publication No. 2017/0106330 and Keith, D., et al. (2018) *Joule* 2(8):1573-1594, which are incorporated by reference herein in their entireties. In some embodiments, $CO_2$ is provided from an industrial source, and optionally may be concentrated via a gas separation procedure, thereby resulting in high concentration food grade $CO_2$.

In certain embodiments, an increase in system capacity is met by vertical scaling, rather than only scaling horizontally. This is in contrast to phototrophic approaches using algae, cyanobacteria, or higher-plants for $CO_2$ capture. Although various vertical farming schemes have been proposed for photosynthetic systems, practically and economically speaking, phototrophic systems must expand horizontally, for example in shallow ponds or photobioreactors in the case of algae. This results in large geographic footprints and many negative environmental impacts.

An algal or higher plant system grown with artificial lighting is challenged by inefficient utilization of light energy, and by inefficient conversion of electrical energy to light energy. In certain embodiments, a comparable algal or high-plant culture grown under artificial lighting will require more electrical power than the $CO_2$ capture and/or biomass production system described herein, in terms of $CO_2$ capture and/or biomass production. In certain embodiments, a comparable algal or higher-plant culture grown under artificial lighting will require at least ten times more electrical power than the $CO_2$ capture and/or biomass production system described herein, in terms of power per unit $CO_2$ capture and/or biomass production. For algae or higher-plants grown on artificial lighting, the heat rejection requirement is almost in direct proportion to the electrical input. In certain embodiments of the methods described herein, the heat rejection requirements are lower than for a comparable algal or higher plant system, in terms of $CO_2$ capture and/or biomass production when grown on artificial lighting. In certain embodiments, the heat rejection requirements are at least ten times lower than for a comparable algal or higher plant system, in terms of $CO_2$ capture and/or biomass production when grown on artificial lighting.

In an exemplary but nonlimiting embodiment, a bioreactor containing nutrient medium is inoculated with production cells. Generally, there will follow a lag phase prior to the cells beginning to double. After the lag phase, the cell doubling time decreases and the culture goes into the logarithmic phase. The logarithmic phase is eventually followed by an increase of the doubling time that, while not intending to be limited by theory, is thought to result from either a mass transfer limitation, depletion of nutrients including nitrogen or mineral sources, or a rise in the concentration of inhibitory chemicals, or quorum sensing by the microbes. The growth slows down and then ceases when the culture enters the stationary phase. In certain embodiments, there is an arithmetic growth phase preceding the stationary phase. In order to harvest cell mass, the culture in certain embodiments is harvested in the logarithmic phase and/or in the arithmetic phase and/or in the stationary phase.

The bioreactor or fermenter is used to culture cells through the various phases of their physiological cycle. A bioreactor is utilized for the cultivation of cells, which may be maintained at particular phases in their growth curve. The use of bioreactors is advantageous in many ways for cultivating chemoautotrophic growth. For certain embodiments, protein-rich cell mass, which is used to produce proteins or protein hydrolysates, is grown to high densities in liquid suspension. Generally, the control of growth conditions, including control of dissolved carbon dioxide, oxygen, and other gases such as hydrogen, as well as other dissolved nutrients, trace elements, temperature and pH, is facilitated in a bioreactor. For certain embodiments, protein-rich cell mass, which is used to produce amino acids, peptides, proteins, hydrolysates, extracts, or whole cell products, is grown to high densities and/or grown at high productivities, in liquid suspension within a bioreactor.

Nutrient media, as well as gases, can be added to the bioreactor as either a batch addition, or periodically, or in response to a detected depletion or programmed set point, or continuously over the period the culture is grown and/or maintained. For certain embodiments, the bioreactor at inoculation is filled with a starting batch of nutrient media and/or one or more gases at the beginning of growth, and no additional nutrient media and/or one or more gases are added after inoculation. For certain embodiments, nutrient media and/or one or more gases are added periodically after inoculation. For certain embodiments, nutrient media and/or one or more gases are added after inoculation in response to a detected depletion of nutrient and/or gas. For certain embodiments, nutrient media and/or one or more gases are added continuously after inoculation.

For certain embodiments, the added nutrient media does not contain any organic compounds.

In certain embodiments, a small amount of microorganism cells (i.e., an inoculum) is added to a set volume of culture medium; the culture is then incubated; and the cell mass passes through lag, exponential, deceleration, and stationary phases of growth.

In batch culture systems, the conditions (e.g., nutrient concentration, pH, etc.) under which the microorganism is cultivated generally change continuously throughout the period of growth. In certain non-limiting embodiments, to avoid the fluctuating conditions inherent in batch cultures, and to improve the overall productivity of the culture system, the microorganisms that are used for the production of protein and/or vitamins and/or other nutrients are grown in a continuous culture system called a chemostat. In such systems, the culture may be maintained in a perpetual exponential phase of growth by feeding it with fresh medium at a constant rate [F] while at the same time maintaining the volume [V] of the culture constant. In certain embodiments, a continuous culture system ensures that cells are cultivated under environmental conditions that remain roughly constant. In certain embodiments, the cells are maintained in a perpetual exponential phase through the use of a chemostat system. In such a case the dilution rate (D) of the culture equals the growth rate of the microorganism, and is given by: D=F/V. The growth rate of a microorganism in continuous culture may be changed by altering the dilution rate. In certain embodiments, the growth rate of the microorganism is changed by altering the dilution rate. In certain non-limiting embodiments, cells are grown in a chemostat at a dilution rate of around 0.2 $h^{-1}$.

In certain embodiments, inoculation of the culture into the bioreactor is performed by methods including but not limited to transfer of culture from an existing culture inhabiting another bioreactor, or incubation from a seed stock raised in an incubator. In certain embodiments, the seed stock of the strain may be transported and stored in forms including but not limited to a powder, liquid, frozen, or freeze-dried form as well as any other suitable form, which may be readily recognized by one skilled in the art. In certain non-limiting embodiments, the reserve bacterial cultures are kept in a metabolically inactive, freeze-dried state until required for restart. In certain embodiments, when establishing a culture in a very large reactor, cultures are grown and established in progressively larger intermediate scale vessels prior to inoculation of the full-scale vessel.

For certain embodiments, the bioreactors have mechanisms to enable mixing of the nutrient media that include, but are not limited to, one or more of the following: spinning stir bars, blades, impellers, or turbines; spinning, rocking, or turning vessels; gas lifts, sparging; recirculation of broth from the bottom of the container to the top via a recirculation conduit, flowing the broth through a loop and/or static mixers. The culture media may be mixed continuously or intermittently.

In certain embodiments the microorganism-containing nutrient medium may be removed from the bioreactor partially or completely, periodically or continuously, and in certain embodiments is replaced with fresh cell-free medium to maintain the cell culture in an exponential growth phase, and/or to replenish the depleted nutrients in the growth medium, and/or remove inhibitory waste products.

The ports that are standard in bioreactors may be utilized to deliver, or withdraw, gases, liquids, solids, and/or slurries, into and/or from the bioreactor vessel enclosing the microbes. Many bioreactors have multiple ports for different purposes (e.g., ports for media addition, gas addition, probes for pH and dissolved oxygen (DO), and sampling), and a given port may be used for various purposes during the course of a fermentation run. As an example, a port might be used to add nutrient media to the bioreactor at one point in time, and at another time might be used for sampling. Preferably, the multiple uses of a sampling port can be performed without introducing contamination or invasive species into the growth environment. A valve or other actuator enabling control of the sample flow or continuous sampling can be provided to a sampling port. For certain embodiments, the bioreactors are equipped with at least one port suitable for culture inoculation that can additionally serve other uses including the addition of media or gas. Bioreactor ports enable control of the gas composition and flow rate into the culture environment. For example, the ports can be used as gas inlets into the bioreactor through which gases are pumped.

For some embodiments, gases that may be pumped into a bioreactor include, but are not limited to, one or more of the following: syngas, producer gas, hydrogen gas, CO, $CO_2$, $O_2$, air, air/$CO_2$ mixtures, natural gas, methane, ammonia, nitrogen, noble gases, such as argon, as well as other gases. In some embodiments the $CO_2$ pumped into the system may come from sources including, but not limited to: $CO_2$ from the gasification of organic matter; $CO_2$ from the calcination of limestone, $CaCO_3$, to produce quicklime, CaO; $CO_2$ from methane steam reforming, such as the $CO_2$ byproduct from ammonia, methanol, or hydrogen production; $CO_2$ from combustion, incineration, or flaring; $CO_2$ byproduct of anaerobic or aerobic fermentation of sugar; $CO_2$ byproduct of a methanotrophic bioprocess; geologically or geothermally produced or emitted $CO_2$; $CO_2$ removed from acid gas or natural gas. In certain non-limiting embodiments, the $CO_2$ has been removed from an industrial flue gas, or intercepted from a geological source that would otherwise naturally emit into the atmosphere. In certain embodiments, the carbon source is $CO_2$ and/or bicarbonate and/or carbonate dissolved in sea water or other bodies of surface or underground water. In certain such embodiments the inorganic carbon may be introduced to the bioreactor dissolved in liquid water and/or as a solid. In certain embodiments, the carbon source is $CO_2$ captured from the atmosphere. In certain non-limiting embodiments, the $CO_2$ has been captured from a closed cabin as part of a closed-loop life support system, using equipment such as but not limited to a $CO_2$ removal assembly (CDRA), which is utilized, for example, on the International Space Station (ISS).

In certain non-limiting embodiments, geological features such as, but not limited to, geothermal and/or hydrothermal vents that emit high concentrations of energy sources (e.g. $H_2$, $H_2S$, CO gases) and/or carbon sources (e.g. $CO_2$, $HCO_3^-$, $CO_3^{2-}$) and/or other dissolved minerals may be utilized as nutrient sources for the microorganisms herein.

In certain embodiments, one or more gases in addition to carbon dioxide, or in place of carbon dioxide as an alternative carbon source, are either dissolved into solution and fed to the culture broth and/or dissolved directly into the culture broth, including but not limited to gaseous electron donors and/or carbon sources (e.g., hydrogen and/or CO and/or methane gas). In certain embodiments, input gases may include other electron donors and/or electron acceptors and/or carbon sources and/or mineral nutrients such as, but not limited to, other gas constituents and impurities of syngas (e.g., hydrocarbons); ammonia; hydrogen sulfide; and/or other sour gases; and/or $O_2$; and/or mineral containing particulates and ash.

In certain embodiments, one or more gases are dissolved into the culture broth, including but not limited to gaseous electron donors such as, but not limited to, one or more of the following: hydrogen, carbon monoxide, methane, hydrogen sulfide or other sour gases; gaseous carbon sources such as, but not limited to one or more of the following: $CO_2$, CO, $CH_4$; and electron acceptors such as, but not limited to, oxygen, either within air (e.g., 20.9% oxygen) or as pure $O_2$ or as an $O_2$-enriched gas. In some embodiments, the dissolution of these and other gases into solution is achieved using a system of compressors, flowmeters, and flow valves known to one skilled in the art of fermentation engineering, that feed into one of more of the following widely used systems for dispersing gas into solution: sparging equipment; diffusers including but not limited to dome, tubular, disc, or doughnut geometries; coarse or fine bubble aerators; venturi equipment. In certain embodiments, surface aeration and/or gas mass transfer may also be performed using paddle aerators and the like. In certain embodiments, gas dissolution is enhanced by mechanical mixing with an impeller or turbine, as well as hydraulic shear devices to reduce bubble size. Following passage through the reactor system holding microorganisms which uptake the gases, in certain embodiments the residual gases may either be recirculated back to the bioreactor, or burned for process heat, or flared, or injected underground, or released into the atmosphere. In certain embodiments herein utilizing $H_2$ as electron donor, $H_2$ may be fed to the culture vessel either by bubbling it through the culture medium, or by diffusing it through a hydrogen permeable-water impermeable membrane known in the art that interfaces with the liquid culture medium.

In certain embodiments, the microorganisms grow and multiply on $H_2$ and $CO_2$ and other dissolved nutrients under microaerobic conditions. In certain embodiments, a C1 chemical such as but not limited to carbon monoxide, methane, methanol, formate, or formic acid, and/or mixtures containing C1 chemicals including but not limited to various syngas compositions generated from various gasified, pyrolyzed, or steam-reformed fixed carbon feedstocks, are biochemically converted into longer chain organic chemicals (i.e., C2 or longer and, in some embodiments, C5 or longer carbon chain molecules) under one or more of the following conditions: aerobic, microaerobic, anoxic, anaerobic, and/or facultative conditions.

A controlled amount of oxygen can also be maintained in the culture broth of some embodiments, and in certain embodiments, oxygen will be actively dissolved into solution fed to the culture broth and/or directly dissolved into the culture broth. In certain aerobic or microaerobic embodiments that require the pumping of air or oxygen into the culture broth in order to maintain targeted DO levels, oxygen bubbles may be injected into the broth at an optimal diameter for mixing and oxygen transfer.

In some embodiments, the microorganisms convert a fuel gas, including but not limited to syngas, producer gas, CO, $CO_2$, $H_2$, natural gas, methane, and mixtures thereof. In some embodiments, the heat content of the fuel gas is at least 100 BTU per standard cubic foot (scf). In some embodiments, a bioreactor that is used to contain and grow the microorganisms is equipped with fine-bubble diffusers and/or high-shear impellers for gas delivery.

Introducing and/or raising the gas flow rate into a bioreactor can enhance mixing of the culture and produce turbulence if the gas inlet is positioned beneath the surface of the liquid media such that gas bubbles or sparges up through the media. In certain embodiments, mixing is enhanced through turbulence provided by gas bubbles and/or sparging and/or gas plugging up through the liquid media. In some embodiments, a bioreactor comprises gas outlet ports for gas escape and pressure release. In some embodiments, gas inlets and outlets are preferably equipped with check valves to prevent gas backflow.

In certain embodiments where chemosynthetic reactions occur within the bioreactor, one or more types of electron donor and one or more types of electron acceptor are pumped or otherwise added as either a bolus addition, or periodically, or continuously to the nutrient medium containing chemoautotrophic organisms in the reaction vessel. The chemosynthetic reaction, driven by the transfer of electrons from electron donor to electron acceptor in cellular respiration, fixes inorganic carbon dioxide and/or other dissolved carbonates and/or other carbon oxides into organic compounds and biomass.

In certain embodiments a nutrient media for culture growth and production is used, comprising an aqueous solution containing suitable minerals, salts, vitamins, cofactors, buffers, and other components needed for microbial growth, known to those skilled in the art [Bailey and Ollis, Biochemical Engineering Fundamentals, $2^{nd}$ ed; pp 383-384 and 620-622; McGraw-Hill: New York (1986)].

In certain embodiments, the chemicals used for maintenance and growth of microbial cultures as known in the art are included in the nutrient media. In certain embodiments, these chemicals may include but are not limited to one or more of the following: nitrogen sources such as ammonia, ammonium (e.g., ammonium chloride ($NH_4Cl$), ammonium sulfate (($NH_4)_2SO_4$)), nitrate (e.g., potassium nitrate ($KNO_3$)), urea or an organic nitrogen source; phosphate (e.g., disodium phosphate ($Na_2HPO_4$), potassium phosphate ($KH_2PO_4$), phosphoric acid ($H_3PO_4$), potassium dithiophosphate ($K_3PS_2O_2$), potassium orthophosphate ($K_3PO_4$), dipotassium phosphate ($K_2HPO_4$)); sulfate; yeast extract; chelated iron; potassium (e.g., potassium phosphate ($KH_2PO_4$), potassium nitrate ($KNO_3$), potassium iodide (KI), potassium bromide (KBr)); and other inorganic salts, minerals, and trace nutrients (e.g., sodium chloride (NaCl), magnesium sulfate ($MgSO_4$ $7H_2O$) or magnesium chloride ($MgCl_2$), calcium chloride ($CaCl_2$)) or calcium carbonate ($CaCO_3$), manganese sulfate ($MnSO_4$ $7H_2O$) or manganese chloride ($MnCl_2$), ferric chloride ($FeCl_3$), ferrous sulfate ($FeSO_4$ $7H_2O$) or ferrous chloride (FeCl.sub.2 4H.sub.2O), sodium bicarbonate ($NaHCO_3$) or sodium carbonate ($Na_2CO_3$), zinc sulfate ($ZnSO_4$) or zinc chloride ($ZnCl_2$), ammonium molybdate ($NH_4MoO_4$) or sodium molybdate ($Na_2MoO_4$ $2H_2O$), cuprous sulfate ($CuSO_4$) or copper chloride ($CuCl_2$ $2H_2O$), cobalt chloride ($CoCl_2$ $6H_2O$), aluminum chloride ($AlCl_3.6H_2O$), lithium chloride (LiCl), boric acid ($H_3BO_3$), nickel chloride $NiCl_2$ $6H_2O$, tin chloride ($SnCl_2H_2O$), barium chloride ($BaCl_2$ $2H_2O$), copper selenate ($CuSeO_4$ $5H_2O$) or sodium selenite ($Na_2SeO_3$), sodium metavanadate ($NaVO_3$), chromium salts). In certain embodiments, the mineral salts medium (MSM) formulated by Schlegel et al may be used ["Thermophilic bacteria", Jakob Kristjansson, Chapter 5, Section III, CRC Press, (1992)].

Microorganisms described herein can be cultured in some embodiments in media of any type (rich or minimal), including fermentation medium, and any composition. As would be understood by one of ordinary skill in the art, routine optimization would allow for use of a variety of types of media. The selected medium can be supplemented with various additional components. Some non-limiting examples of supplemental components include glucose, antibiotics, isopropyl β-D-1-thiogalactopyranoside (IPTG) for gene induction, and ATCC Trace Mineral Supplement. Similarly, other aspects of the medium and growth conditions of the microorganisms described herein may be optimized through routine experimentation. For example, pH and temperature are non-limiting examples of factors which can be optimized. In some embodiments, factors such as choice of media, media supplements, and temperature can influence production levels of a desired molecule. In some embodiments, the concentration and amount of a supplemental component may be optimized. In some embodiments, how often the media is supplemented with one or more supplemental components, and the amount of time that the media is cultured before harvesting the desired molecule is optimized.

In certain embodiments, the concentrations of nutrient chemicals (e.g., electron donors, electron acceptors, carbon sources, and/or various mineral nutrients), are maintained within the bioreactor close to or at their respective optimal levels for optimal carbon uptake and/or fixation and/or conversion and/or production of biomass and/or organic compounds, which varies depending upon the microorganism utilized but may be routinely determined and/or optimized by one of ordinary skill in the art of culturing microorganisms.

In certain embodiments, one or more of the following parameters are monitored and/or controlled in the bioreactor: waste product levels; pH; temperature; salinity; dissolved oxygen; dissolved carbon dioxide gas; liquid flow rates; agitation rate; gas pressure. In certain embodiments, the operating parameters affecting chemoautotrophic growth are monitored with sensors (e.g., dissolved oxygen probe or oxidation-reduction probe to gauge electron donor/acceptor concentrations), and/or are controlled either manually or automatically based upon feedback from sensors through the use of equipment including but not limited to actuating valves, pumps, and agitators. In certain embodiments, the temperature of the incoming broth as well as of incoming gases is regulated by systems such as, but not limited to, coolers, heaters, and/or heat exchangers.

In certain embodiments, the microbial culture and bioreaction is maintained using continuous influx and removal of nutrient medium and/or biomass, in steady state where the cell population and environmental parameters (e.g., cell density, pH, DO, chemical concentrations) are targeted at a constant level over time. In certain embodiments, the constant level is an optimal level for feedstock conversion and/or production of targeted organic compounds. In certain embodiments, cell densities can be monitored by direct sampling, by a correlation of optical density to cell density, and/or with a particle size analyzer. In certain embodiments, the hydraulic and biomass retention times can be decoupled so as to allow independent control of both the broth chemistry and the cell density. In certain embodiments, dilution rates can be kept high enough so that the hydraulic retention time is relatively low compared to the biomass retention time, resulting in a highly replenished broth for cell growth and/or feedstock conversion and/or production of organic compounds. In certain embodiments, dilution rates are set at an optimal technoeconomic trade-off between culture broth and nutrient replenishment and/or waste product removal, and increased process costs from pumping, increased inputs, and other demands that rise with dilution rates.

In certain embodiments, the pH of the microbial culture is controlled. In certain embodiments, pH is controlled within an optimal range for microbial maintenance and/or growth and/or conversion of feedstock and/or production of organic compounds and/or survival. To address a decrease in pH, in certain embodiments a neutralization step can be performed directly in the bioreactor environment or prior to recycling the media back into the culture vessel through a recirculation loop. Neutralization of acid in the broth of certain embodiments can be accomplished by the addition of bases, including but not limited to one or more of the following: limestone, lime, sodium hydroxide, ammonia, ammonium hydroxide, caustic potash, magnesium oxide, iron oxide, alkaline ash.

In certain embodiments, an aqueous suspension of chemoautotrophic microorganisms converts one or more electron donors and $CO_2$ into protoplasm. In certain embodiments, an aqueous suspension of hydrogen-oxidizing microorganisms can be used to convert hydrogen and carbon dioxide into microbial protoplasm. In certain embodiments, an aqueous suspension of carbon monoxide-oxidizing microorganisms can be used to convert carbon monoxide and hydrogen and/or water into protoplasm. In certain embodiments, an aqueous suspension of methane-oxidizing microorganisms can be used to convert methane into protoplasm. In certain embodiments, the microorganism in suspension is a bacterium or an archaeon. In certain non-limiting embodiments, an aqueous suspension or biofilm of $H_2$-oxidizing chemoautotrophic microorganisms converts $H_2$ and $CO_2$, along with some other dissolved mineral nutrients, into biochemicals and protoplasm. In certain embodiments, the other dissolved mineral nutrients include, but are not limited to, a nitrogen source, a phosphorous source, and a potassium source. In certain embodiments, the protoplasm produced is of food value to humans and/or other animals and/or other heterotrophs. In certain embodiments, certain biochemicals may be extracted from the protoplasm and/or extracellular broth, which have nutrient value, and/or value in a variety of organic chemistry or fuel applications. In certain embodiments, the intracellular energy to drive this production of protoplasm is derived from the oxidation of an electron donor by an electron acceptor. In certain non-limiting embodiments, the electron donor includes, but is not limited to, one or more of the following: $H_2$; CO; $CH_4$. In certain non-limiting embodiments, the electron acceptor includes but is not limited to $O_2$ and/or $CO_2$. In certain non-limiting embodiments, the product of the energy generating reaction, or respiration, includes but is not limited to water. In certain embodiments, the intracellular energy derived from respiration used to drive this synthesis of biochemicals and protoplasm from $CO_2$ is stored and carried in biochemical molecules including, but not limited to, ATP. For the knallgas microbes used in certain embodiments herein, the electron acceptor is $O_2$ and the product of respiration is water.

In some embodiments the protein production and/or distribution of amino acid molecules produced is optimized through one or more of the following: control of bioreactor conditions, control of nutrient levels, and/or genetic modifications of the cells. In certain embodiments, pathways to amino acids, or proteins, or other nutrients, or whole cell products are controlled and optimized for the production of chemical products by maintaining specific growth conditions (e.g., levels of nitrogen, oxygen, phosphorous, sulfur, trace micronutrients such as inorganic ions, and if present any regulatory molecules that might not generally be considered a nutrient or energy source). In certain embodiments, dissolved oxygen (DO) may be optimized by maintaining the broth in aerobic, microaerobic, anoxic, anaerobic, or facultative conditions, depending upon the requirements of the microorganisms. A facultative environment is considered to be one having aerobic upper layers and anaerobic lower layers caused by stratification of the water column. The biosynthesis of amino acids, or proteins, or other nutrients, or whole cell products by the microbes disclosed herein can happen during the logarithmic phase or afterwards during the stationary phase when cell doubling has stopped, provided there is sufficient supply of carbon and energy and other nutrient sources.

In some embodiments, the growth medium for a microorganism described herein includes a protein and/or nutrient source from another microorganism (e.g., cell lysate, protein hydrolysate, peptides, oligopeptides, and/or amino acids, and/or organic molecules and/or other nutrients from a different microorganism). In some embodiments, the microorganism in the growth medium is a GRAS microorganism. In one embodiment, the growth medium for a lactic acid bacterium, such as, but not limited to, a *Lactococcus, Lactobacillus, Enterococcus, Streptococcus*, or *Pediococcus* bacterium (for example, a GRAS lactic acid bacterium, such as a GRAS *Lactococcus, Lactobacillus, Enterococcus, Streptococcus*, or *Pediococcus* bacterium), includes cell lysate, protein hydrolysate, peptides, oligopeptides, and/or amino acids, and/or organic molecules and/or other nutrients from a different microorganism, such as any of the microorganisms described herein, including but not limited to, a *Cupriavidus* microorganism, such as, but not limited to *Cupriavidus necator*, for example, *Cupriavidus necator* DSM 531 or DSM 541. In another embodiment, growth medium for a fungal microorganism, such as a *Fusarium* or *Rhizopus* fungal microorganism (for example, a GRAS fungal microorganism, such as a GRAS *Fusarium* or Rhozopus fungal microorganism), such as any of the microorganisms described herein, including but not limited to, *Fusarium venenatum, Rhizopus oligosporus*, or *Rhizopus oryzae*, includes cell lysate, protein hydrolysate, peptides, oligopeptides, and/or amino acids, and/or organic molecules and/or other nutrients from a different microorganism, such as, but not limited to, a *Cupriavidus* microorganism, such as, but not limited to *Cupriavidus necator*, for example, *Cupriavidus necator* DSM 531 or DSM 541.

In some embodiments, a fungal microorganism that is capable of lysing bacterial cells and/or hydrolyzing bacterial protein is cultured in the presence of such bacterial cells. For example, bacterial biomass may be isolated and optionally dewatered, and then fungal microorganisms inoculated onto the bacterial biomass, or fungal microorganisms may be cultured in a growth medium as described herein, in the presence of bacterial biomass. In certain nonlimiting embodiments, the fungal microorganisms include *Fusarium* or *Rhizopus* microorganisms, such as but not limited to, *Fusarium venenatum, Rhizopus oligosporus*, or *Rhizopus oryzae*.

The specific examples of bioreactors, culture conditions, heterotrophic and chemotrophic growth, maintenance, and amino acids, or proteins, or other nutrients, or whole cell product production methods described herein can be combined in any suitable manner to improve efficiencies of microbial growth and amino acid, or protein, or other nutrient, or whole cell production.

Electron Donors and Acceptors

In certain non-limiting embodiments, microorganisms described herein are grown chemoautotrophically. For example, the microorganism growth may utilize biosynthetic reduction of $CO_2$, utilizing $O_2$ electron acceptor and/or $H_2$ electron donor. In certain embodiments, $O_2$ and $H_2$ are generated by the electrolysis of water. In certain non-limiting embodiments, part of the $O_2$ generated by electrolysis of water, and all of the $H_2$, is fed to an aqueous suspension of microorganisms as described herein. In certain non-limiting embodiments, the molar ratio of $H_2$ fed to an aqueous suspension of microorganisms to the moles of $O_2$ is greater than 2:1. In certain non-limiting embodiments where $O_2$ electron acceptor and $H_2$ electron donor are generated by the electrolysis of water, there is a surplus of $O_2$ remaining after all of the metabolic requirements of the microorganisms for $H_2$ and $O_2$ have been met. In certain such embodiments the surplus $O_2$ may be supplied to humans and/or other aerobic lifeforms and/or to hydroponic systems for root aeration and/or is used in a gasification or partial oxidation or combustion process and/or is stored and sold as a chemical co-product.

In certain embodiments that utilize molecular hydrogen as an electron donor, there can be a chemical co-product formed in the generation of molecular hydrogen using a renewable and/or $CO_2$ emission-free energy input. In certain embodiments, the oxyhydrogen reaction used in respiration is enzymatically linked to oxidative phosphorylation. In certain embodiments, the ATP and/or other intracellular energy carriers thus formed are utilized in the anabolic synthesis of amino acids and/or proteins. In certain embodiments, the oxygen produced by water-splitting in excess of what is required for respiration in order to maintain optimal conditions for carbon fixation and organic compound production by the knallgas microorganisms, may be processed into a form suitable for sale through process steps known in the art and science of commercial oxygen gas production.

Certain embodiments apply hydrogen-oxidizing and/or CO-oxidizing and/or $CH_4$ oxidizing microorganisms that use more electronegative electron acceptors than $CO_2$ in energy conserving reactions for ATP production (e.g., respiration), such as but not limited to $O_2$. For example, hydrogenotrophic oxyhydrogen or knallgas microbes that couple the oxyhydrogen reaction, $2H_2 + O_2 \rightarrow 2H_2O$, to ATP production, can produce more ATP per $H_2$ and/or other electron donor consumed for respiration, than acetogens or methanogens that use $CO_2$ as an electron acceptor in respiration. For example, knallgas microorganisms can produce at least two ATP per $H_2$ consumed in respiration [L. Bongers (1970) "Energy generation and utilization in hydrogen bacteria" *Journal of bacteriology* 104(1):145-151, which is incorporated herein by reference in its entirety], which is eight times more ATP produced per $H_2$ consumed in respiration than what can be produced in microorganisms undergoing methanogenesis or acetogenesis, using $H_2$ as electron donor and $CO_2$ as electron acceptor in respiration. For this reason, using microorganisms that can utilize more electronegative electron acceptors in respiration and in the production of ATP, such as but not limited to knallgas microbes, for anabolic biosynthesis such as but not limited to amino acid or protein or fatty acid biosynthesis from syngas or $H_2$, can be more efficient than using acetogens or methanogens, such as those which are currently used in biological GTC technologies for the production of short chain acids or alcohols (e.g., acetic acid or ethanol). In certain embodiments, the oxyhydrogen reaction used in respiration is enzymatically linked to oxidative phosphorylation. In certain embodiments, aerobic respiration is utilized by the microorganism cells described herein for the production of ATP. In certain embodiments, the ATP and/or other intracellular energy carriers thus formed are utilized in the anabolic biosynthesis of amino acids and/or proteins. In some embodiments, a knallgas and/or carboxydotrophic and/or methanotrophic and/or heterotrophic microorganism or a compositions comprising these microorganisms is utilized, wherein the microorganism expresses one or more enzymes that enables biosynthesis of useful carbon-based products of interest including but not limited to chemicals, monomers, polymers, proteins, polysaccharides, vitamins, nutraceuticals, antibiotics, or pharmaceutical products or intermediates thereof from a carbon-containing gas feedstock, including but not limited to syngas or producer gas or natural gas or biogas or $CO_2$ combined with renewable $H_2$ or CO or methane containing gases. In some embodiments, these said carbon-based products of interest can be biosynthesized heterotrophically from an organic multi-carbon feedstock, such as, but not limited to glucose, fructose, and other sugars. In some non-limiting embodiments, a microorganism, or a composition comprising a microorganism is utilized, wherein the microorganism requires less than $4H_2$ or NADH to produce one ATP through respiration. In other non-limiting embodiments, a microorganism is utilized that produces more than one ATP per $H_2$ or NADH consumed through respiration. In other non-limiting embodiments a microorganism is utilized that produces at least two ATP per $H_2$ or NADH consumed through respiration, or at least 2.5 ATP per $H_2$ or NADH consumed through respiration.

An additional feature of certain non-limiting embodiments regards the source, production, or recycling of the electron donors used by chemoautotrophic microorganisms to fix carbon dioxide and/or other C1 feedstocks into organic compounds. The electron donors used for carbon dioxide capture and carbon fixation can be produced or recycled in certain embodiments electrochemically or thermochemically using power from a number of different renewable and/or low carbon emission energy technologies including but not limited to: photovoltaics, solar thermal, wind power, hydroelectric, nuclear, geothermal, enhanced geothermal, ocean thermal, ocean wave power, tidal power. Many of the reduced inorganic chemicals upon which chemoautotrophs can grow (e.g., $H_2$, CO, $H_2S$, ferrous iron, ammonium, $Mn^{2+}$) can be readily produced using electrochemical and/or thermochemical processes well known in the art and science of chemical engineering that can be powered by a variety carbon dioxide emission-free or low-carbon emission and/or renewable sources of power including but not limited to photovoltaics, solar thermal, wind power, hydroelectric, nuclear, geothermal, enhanced geothermal, ocean thermal, ocean wave power, or tidal power.

The production of hydrogen from renewable energy sources is gradually replacing the generation from fossil feedstock systems, and the technical advances in the energy sector are expected to lower the prices of green hydrogen production in the near future. For instance, electrical energy efficiencies up to 73% are already achieved by commercial and industrial grade electrolyzers, and research on new materials and electrolyzer configurations have shown possible efficiencies as high as 96%. Certain embodiments utilize a commercially available electrolysis technology with electrical energy efficiency of over 70% for the generation of $H_2$ electron donor and/or $O_2$ electron acceptor. Certain embodiments use electrolysis technologies with 73% or higher energy efficiency, and/or up to 96% energy efficiency, or higher.

In certain embodiments that use molecular hydrogen as electron donor, the $H_2$ is generated by methods well known to art and science of chemical and process engineering, including but not limited to one or more of the following: through electrolysis of water including but not limited to approaches using Proton Exchange Membranes (PEM), liquid electrolytes such as KOH, alkaline electrolysis, Solid Polymer Electrolyte electrolysis, high-pressure electrolysis, high temperature electrolysis of steam (HTES); and/or through the thermochemical splitting of water through methods including but not limited to the iron oxide cycle, cerium(IV) oxide-cerium(III) oxide cycle, zinc zinc-oxide cycle, sulfur-iodine cycle, copper-chlorine cycle, calcium-bromine-iron cycle, hybrid sulfur cycle; and/or electrolysis of hydrogen sulfide; and/or thermochemical splitting of hydrogen sulfide; and/or other electrochemical or thermochemical processes known to produce hydrogen with low- or no-carbon dioxide emissions including but not limited to: carbon capture and sequestration (CCS) enabled methane reforming. In certain embodiments, the approach to generating $H_2$ includes but is not limited to electrolysis powered by renewable electrical energy and/or electricity from a low-greenhouse gas (GHG) source. In certain embodiments, electrolysis is powered by one or more of the following: solar, including but not limited to, photovoltaics and/or solar thermal; wind power, hydroelectric; nuclear; geothermal; enhanced geothermal; ocean thermal; ocean wave power; tidal power.

Worldwide there are enormous wind energy resources, of which only a tiny percentage is utilized. The low current utilization is mainly attributed to the intermittent nature of wind resources, resulting in varying electricity generation over time, and underutilization of capacity to meet energy demand at most hours. The common mismatch between wind power supply and grid demand is manifested in examples from around the world, such as in Scotland where wind farms have been paid to shut down turbines due to oversupply [http://www.mnn.com/earth-matters/energy/blogs/blown-away-wind-turbines-generate-enough-energy-to-power-every-home-in], and in parts of Texas where electricity has been provided for free at night when wind power is high and grid demand is low [http://www.nytimes.com/2015/11/09/business/energy-environment/a-texas-utility-offers-a-nighttime-special-free-electricity.html?_r=2]. This challenge may be resolvable by utilizing wind power produced during off-peak demand hours to produce $H_2$ feedstock for the process in certain embodiments herein.

Currently, hydrogen is increasingly regarded as a possible energy storage system in the so-called "power-to-gas" approach. The inherent instability of renewable energy production (particularly solar and wind energy), and excess grid electricity (off-peak energy) may be mitigated by the production of hydrogen through water electrolysis. According to most current schemes, the produced hydrogen gas may then be converted back to electricity, by fuel cells and/or gas turbines, during periods of peak demand. Or alternatively the $H_2$ may be fed into the gas grid, or converted to methane via methanation. Furthermore, the hydrogen may be used as a raw material in the chemical, petrochemical, metallurgy and food industries. Certain embodiments provide new options within the power-to-gas framework, by enabling the $H_2$ to be used in a wider range of products, including biochemicals and in particular proteins, amino acids, fertilizers, and biostimulants. In certain embodiments, hydrogen produced using excess grid electricity and/or off-peak energy is used as an electron donor for one or more metabolic pathways occurring in hydrogen-utilizing microorganisms. In certain embodiments, the hydrogen and/or the oxygen needed for the microbial biosynthesis by hydrogen-oxidizing bacteria and/or aerobic bacteria is generated by water electrolysis using renewable energy, and in particular off-peak electricity, i.e., electrical power available when the energy supply exceeds demand, and which, in the current situation, is often wasted.

In certain embodiments, onsite storage of $H_2$ and $CO_2$ gases enables diversion of power from the grid only during periods when renewable generation exceeds electrical demand. In certain embodiments, power is allowed to flow as usual into the grid during periods of higher demand. In certain embodiments, the process does not disrupt renewable power supply, but rather enables more complete utilization of renewable generation capacity such as, but not limited to, wind and solar. Certain embodiments allow continued renewable operation and generation even during periods when electrical generation exceeds grid demand (e.g., off-peak wind or solar generation).

In certain embodiments, hydrogen electron donors are not necessarily generated with low- or no-carbon dioxide emissions. However, in certain such embodiments the hydrogen is generated from sustainable or low value sources of energy and/or carbon using methods known in the art of chemical and process engineering. Such methods include but are not limited to gasification, pyrolysis, steam-reforming, or autothermal reforming of feedstock such as but not limited to one or more of the following: agricultural materials, wood, methane hydrates, straw, sea weed and kelp, and low value, highly lignocellulosic biomass in general. In certain embodiments, a synthesis gas or producer gas containing $H_2$ and/or CO and/or $CO_2$ is utilized as an electron donor and/or as a carbon source. In certain embodiments, the $H_2$ and/or CO and/or $CO_2$ contained in a syngas or producer gas is supplemented by $H_2$ generated using a renewable and/or low-GHG energy source and conversion process such as one or more of those described herein.

In certain non-limiting embodiments, reduction of $CO_2$ occurs and/or synthesis of cellular material that can be utilized as a food or nutrition source. In certain embodiments, the ratio of hydrogen to carbon monoxide in syngas or producer gas may be adjusted through the water gas shift reaction and/or carbon capture, prior to the gas being delivered to the microbial culture. In certain embodiments, C1 compounds are generated through methane steam reforming of methane or natural gas, and particularly stranded natural gas, or natural gas that would be otherwise flared or released to the atmosphere, or biogas, or landfill gas, and provided as a syngas and/or producer gas or liquid stream of C1 compounds to the culture of microorganisms, where in certain embodiments the ratio of hydrogen to carbon monoxide in the syngas or producer gas may be adjusted through the water gas shift reaction and/or carbon capture, prior to the gas being delivered to the microbial culture.

The following examples are intended to illustrate, but not limit, the invention.

EXAMPLES

Example 1. Emulsion Stability

The ability of an emulsion to resist change in its properties over time was investigated.

Study samples:

Whey protein isolate (PI) (50% protein)

Sugar-grown whole cell biomass (WCB) (12.86% N; 70.9% protein using 5.5 Jones factor)

Procedure: A mixture of 5 g protein solution and 5 g oil was mixed well on a homogenizer. The mixture was incubated at room temperature. The volume of the aqueous phase was measured. Percent emulsion stability was calculated according to the following formula:

$$\% \text{ emulsion stability} = \frac{V_B - V_A}{V_B} \times 100\%$$

where: $V_B$ is the volume of the aqueous phase before emulsification $V_A$ is the volume of the aqueous phase after a set time (e.g. 30 minutes)

Emulsion Stability of Whey PI and WCB

A protein solution was prepared in distilled water: 4.58% Whey PI, pH6.50; 4.33% WCB, pH6.26. 5 g of the protein solution was mixed with 5 g corn oil, and homogenized on an IKA Turrax T25 digital homogenizer for 5 min. Emulsion solutions were transferred to graduated cylinders, and the volume of the aqueous layer measured. Results are shown in Table 1.

TABLE 1

| % Emulsion Stability | | | | |
|---|---|---|---|---|
| Time Elapsed | 30 min | 1 hr | 2 hr | 22 hr |
| Whey PI | 100% | 84% | 74% | 36% |
| WCB | 100% | 100% | 100% | 73% |

Example 2. Emulsion Capacity

The ability of a protein solution to emulsify oil was investigated.
Study Samples:
Whey protein isolate (PI) (50% protein)
Sugar-grown whole cell biomass (WCB) (12.86% N; 70.9% protein using 5.5 Jones factor)
Procedure: Different mixtures were prepared with a fixed weight of protein solution and different weights of oil. An emulsion was formed using a homogenizer. The conductivity of each emulsified sample was measured. Emulsion capacity was calculated at the inversion point from oil-water (oil droplets in water) to water-oil (water droplets in oil) according to the following formula:

$$\text{Emulsion Capacity} = \frac{\text{Wtg } (g) \text{ oil before and after their inversion point}}{\text{Wtg } (g) \text{ protein used}}$$

Figure 2:
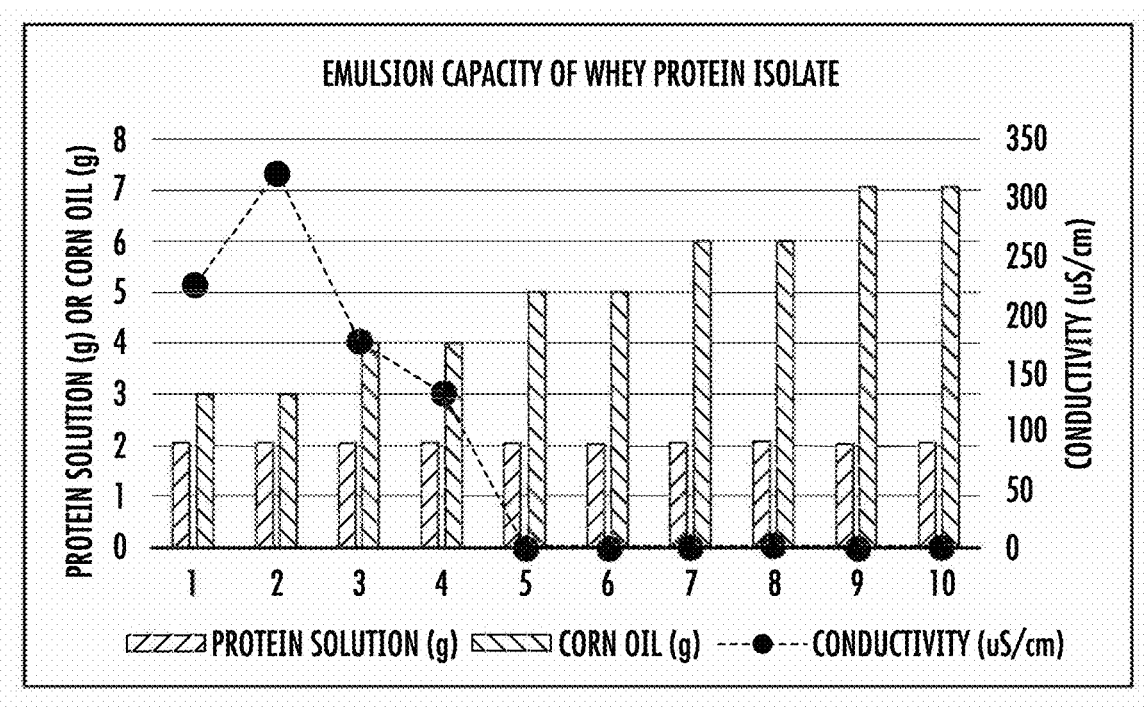
FIG. 2 shows emulsion capacity for whey protein isolate, as described in Example 2.
Figure 3:
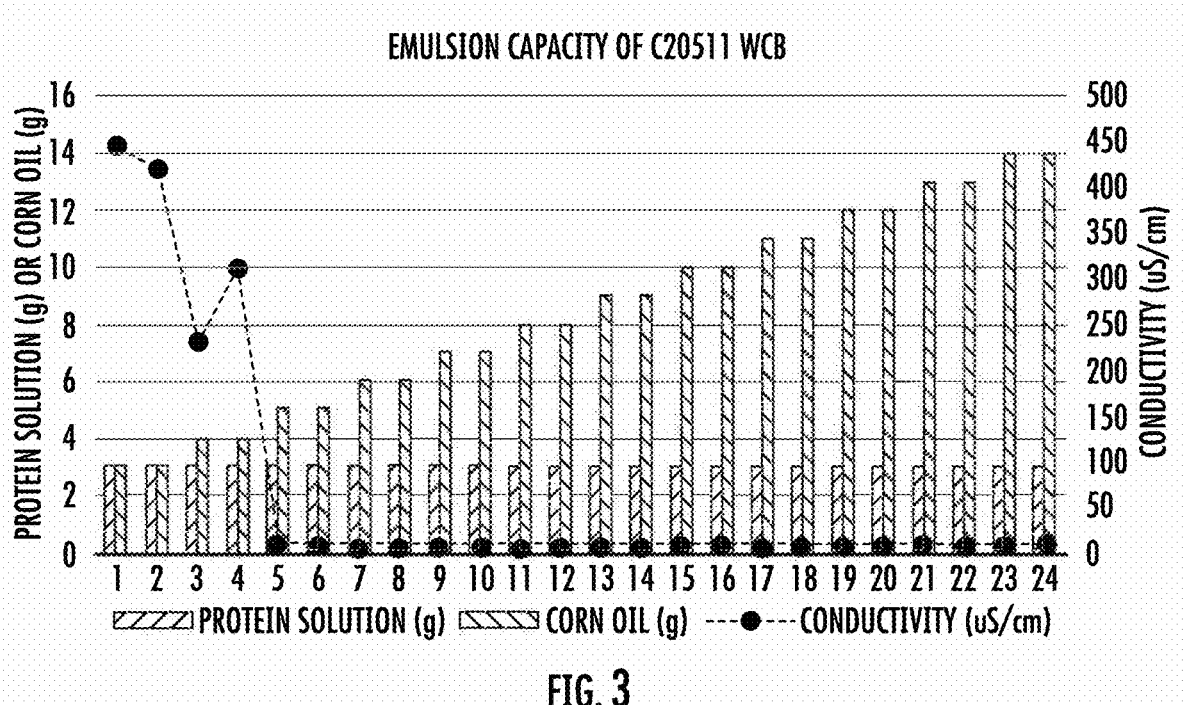
FIG. 3 shows emulsion capacity for whole cell biomass (WCB), as described in Example 2.

For Whey PI, the inversion point occurred at 2 g protein solution (4.583% solid) and 4 g and 5 g oil. The emulsion capacity was 98.19 g oil/g protein. Results are shown in FIG. 2.
For WCB, the inversion point occurred at 3 g protein solution (4.327% solid) and 4 g and 5 g oil. The emulsion capacity was 46.26 g oil/g protein. Results are shown in FIG. 3.

Example 3

Dry texturized biomass protein (TBP) and high moisture meat analogue (HMMA) products were prepared using combinations of microbial protein and soy protein (Alpha DS Soy concentrate, Solae) utilizing the TwinLab-FExtruded. Microbial protein and soy protein were mixed as dry powders in a hopper until they were homogenized. The soy protein was 70 percent protein, 6-8% moisture and 23 percent dietary fiber, while the microbial protein (whole cell biomass) contained 77% protein, about 7% moisture and 10% ash.

The extruders were started with 100% soy and microbial protein was substituted in place of soy. The dry texturized protein used a rod die and cutting device while the high moisture meat analog used the texturizing die and circulator.

The dry texturized biomass protein (TBP) used feed rates of 1.5 kg/hr, water rates between 1.3 kg/hr for 100% soy to 1.7 to 2.02 kg/hr for the analogs containing microbial protein and a screw speed of 1000 rpm. The samples were dried at 40 C for 24 hours after extrusion.

The HMMA products used feed rates of 1.5 kg/hr, water rates between 2.76 kg/hr for 100% soy to 3.4 kg/hr for the analogs containing microbial protein and a screw speed of 1000 rpm. The samples were refrigerated immediately after extrusion.

Specific Mechanical Energy (SME) was calculated for all runs with both soy and soy+microbial protein mix.

SME is a calculation of how much power the motor is using per lb of material was measured. This is calculated from comparing the torque or motor load while running with material to running without material. Also included in the calculation is mass flow rate of material and screw speed. Lower SME with similar product results means the material is degrading or denaturing much easier and can save production costs at scale.

Four TBP conditions and a total of three HMMA were evaluated Overall less SME was required for the microbial protein mixes as compared to the soy only conditions. Microbial protein resulted in textured protein under both the TBP and the HMMA conditions.

Results are shown in Table 3.

TABLE 3

| Sample | Pressure 1-X (bar) | Load (%) | Specific Mechanical Energy (Wh/lb) | Observations |
|---|---|---|---|---|
| Soy only-TBP | 315-340 | 24.6 | 358.7 | High SME. Lighter in color than other TBP samples. Texture was firm but less firm than other TBP samples. |
| Soy + Microbial protein 1-TBP | 243-256 | 20.6 | 219.2 | Lowered SME, more water needed to run effectively. Darker in color, firm texture. |
| Soy + Microbial protein 2-TBP | 259-280 | 17.1 | 153.1 | Further lowered SME. Started to look and feel dry during the run. Darker color, more dense, firm texture. |
| Soy + Microbial protein 3-TBP | 210-230 | 16.8 | 134.0 | Raised water. No longer feels dry, but product was dense. |
| Soy only-HMMA | 302-340 | 20.6 | 164.7 | Good texture. Peels easily. Runs smoothly. |
| Soy + Microbial protein 1-HMMA | 278-300 | 15.4 | 78.8 | Lowered SME, needed more water. Good texture and peels easily. Dark color, resembles pulled pork when shredded. |
| Soy + Microbial protein 2-HMMA | 237-254 | 14.2 | 64.1 | Further decreased SME. Good texture, darker color. |

Figures 4A, 4B:
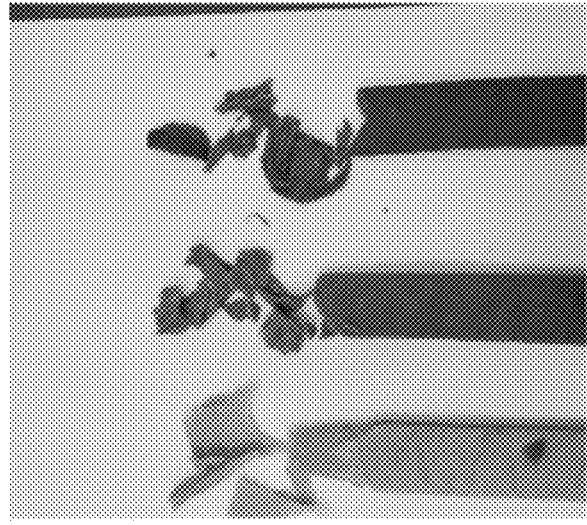
FIGS. 4A-4B show results of extruded microbial protein product/plant protein mixtures as described in Example 3. 4A: TBP sample; 4B: HMMA samples—top to bottom: 20% microbial protein:80% soy; 1-% microbial protein; 90% soy; 100% soy.

The TBP chunks resembled beef crumbles, as shown in FIG. 4A. The HMMA resembled pulled pork. The HMMA could be shredded and coated in barbeque sauce to create a pulled pork analogue product. Further, addition of barbeque sauce with moisture stabilizers could assist with freeze tolerance of the product, extending shelf life. Alternatively, the HMMA could be cut and pressed into small steak-like pieces. Appearance of the HMMA products when pulled apart into "shredded" products is shown in FIG. 4B.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A dough composition for production of a structured meat analogue product for human or animal consumption, the dough composition comprising (i) a first protein product from a first microorganism, (ii) a second protein product comprising one or more of gluten, soy, pea, rice, wheat, algae, or another non-animal protein, (iii) one or more oils, and (iv) a nutritional source for the first microorganism that is produced from a second microorganism, wherein the first protein product comprises protein fiber networks or aligned protein fibers that produce meat-like texture, and wherein the second microorganism comprises a microorganism of the genus *Cupriavidus, Rhodococcus, Hydrogenovibrio, Rhodopseudomonas, Hydrogenobacter, Gordonia, Arthrobacter, Streptomycetes, Rhodobacter*, or *Xanthobacter*, or microorganisms of a consortium of the genera thereof.

2. The dough composition according to claim 1, wherein the first protein product comprises a single cell protein, a cell lysate, a protein isolate, a protein extract, a protein hydrolysate, a free amino acid, a peptide, an oligopeptide, or a combination thereof.

3. The dough composition according to claim 2, wherein the first protein product comprises the protein hydrolysate.

4. The dough composition according to claim 3, wherein the protein hydrolysate is produced under conditions that retain undenatured globular protein.

5. The dough composition according to claim 4, wherein the conditions that retain undenatured globular protein comprise cell lysis and physical separation of soluble components from cell debris.

6. The dough composition according to claim 3, wherein the protein hydrolysate combines with the second protein product to promote structuring or fiber formation.

7. The dough composition according to claim 1, wherein the water content of the dough composition is from about 40% (w/w) to about 80% (w/w) of the dough composition.

8. The dough composition according to claim 1, wherein the shear strength of the dough composition is greater than about 1000 psig.

9. The dough composition according to claim 1, wherein the structured meat analogue product comprises from about 5% to about 25% by weight of the first protein product.

10. The dough composition according to claim 1, wherein the structured meat analogue product is a structured beef, poultry, pork, fish, or seafood analogue product.

11. The dough composition according to claim 1, further comprising hemp, canola, or buckwheat.

12. The dough composition according to claim 1, further comprising a heme-containing polypeptide.

13. The dough composition according to claim 3, wherein the average molecular weight of all peptides in the protein hydrolysate is from about 800 to about 1500 Da.

14. The dough composition according to claim 1, wherein the second microorganism is a non-GRAS microorganism.

15. The dough composition according to claim 3, wherein an average molecular weight of all proteins in the protein hydrolysate is from about 5 kDa to about 10 kDa.

* * * * *